United States Patent
Kim

(10) Patent No.: US 10,985,954 B1
(45) Date of Patent: Apr. 20, 2021

(54) DATA TRANSMISSION DEVICES WITH EFFICIENT TERNARY-BASED DATA TRANSMISSION CAPABILITY AND METHODS OF OPERATING SAME

(71) Applicant: Samsung Electronics Co., Ltd., Suwon-si (KR)

(72) Inventor: Young-Hwa Kim, Hwaseong-si (KR)

(73) Assignee: Samsung Electronics Co., Ltd.

( * ) Notice: Subject to any disclaimer, the term of this patent is extended or adjusted under 35 U.S.C. 154(b) by 0 days.

(21) Appl. No.: 16/887,096

(22) Filed: May 29, 2020

(30) Foreign Application Priority Data

Nov. 5, 2019 (KR) ........................ 10-2019-0140135

(51) Int. Cl.
*H04L 25/49* (2006.01)
*H04L 25/02* (2006.01)

(52) U.S. Cl.
CPC ........ *H04L 25/4917* (2013.01); *H04L 25/028* (2013.01); *H04L 25/0272* (2013.01)

(58) Field of Classification Search
CPC .. H04L 25/4923; H04L 25/4925; H03M 5/16; H03M 5/18
See application file for complete search history.

(56) References Cited

U.S. PATENT DOCUMENTS

| | | | |
|---|---|---|---|
| 3,302,193 A | 1/1967 | Sipress | |
| 4,506,252 A | 3/1985 | Jacoby et al. | |
| 5,533,054 A | 7/1996 | Deandrea et al. | |
| 5,614,905 A * | 3/1997 | Crane | H03M 1/66 341/144 |
| 6,894,536 B2 | 5/2005 | Martin et al. | |
| 8,649,445 B2 | 2/2014 | Cronie et al. | |
| 9,819,444 B2 | 11/2017 | Shen et al. | |
| 2003/0123398 A1* | 7/2003 | Senuma | H04L 25/4923 370/284 |
| 2004/0131089 A1* | 7/2004 | Uemura | H04J 3/047 370/537 |
| 2005/0195642 A1 | 9/2005 | Schmitt | |
| 2005/0220232 A1* | 10/2005 | Kunnari | H04L 25/4923 375/353 |
| 2010/0150576 A1 | 6/2010 | Chung et al. | |
| 2018/0343129 A1 | 11/2018 | Cambou | |
| 2020/0007364 A1* | 1/2020 | Akasaka | H04L 25/4923 |

FOREIGN PATENT DOCUMENTS

EP 2962472 A1 1/2016

OTHER PUBLICATIONS

Botha et al. "Two New Ternary Line Codes" Electronics Letters 26(24):1989-1990 (Nov. 1990).
Extended European Search Report corresponding to EP Application No. 20186238.0 (9 pages) (dated Dec. 10, 2020).

* cited by examiner

*Primary Examiner* — Kevin Kim
(74) *Attorney, Agent, or Firm* — Myers Bigel, P.A.

(57) ABSTRACT

A data transmission device includes first and second lines, and a transmitter configured to convert received binary data into ternary data and output the ternary data onto the first and second lines by toggling only one of the first and second lines during each of a plurality of consecutive 2-bit data transmission time intervals. A receiver is also provided, which is configured to receive the ternary data from the first and second lines and convert the received ternary data into binary data. The transmitter is configured to output the ternary data onto the first and second lines using return-to-zero toggling during each of the 2-bit data transmission time intervals.

20 Claims, 16 Drawing Sheets

| Q1 | Q0 | F_DIFF | F_CM | Decoder |
|---|---|---|---|---|
| 0 | 1 | 0 | 1 | |
| 0 | -1 | 1 | 0 | D0 = F_CM |
| 1 | 0 | 1 | 1 | D1 = XNOR(F_CM,F_DIFF) |
| -1 | 0 | 0 | 0 | |

| LIO2 | LIO0 | GIO_2 | GIO_0 | IOSA_DIFF | IOSA_LVL | Decoder |
|---|---|---|---|---|---|---|
| 1 | 1 | 0 | 1 | 0 | 1 | B_LIO2 = IOSA_LVL |
| 0 | 1 | 0 | -1 | 1 | 0 | |
| 1 | 0 | 1 | 0 | 1 | 1 | B_LIO0 = XNOR(IOSA_LVL, IOSA_DIFF) |
| 0 | 0 | -1 | 0 | 0 | 0 | |

FIG. 16

| Input Data | Case1 | | Case2 | | Case3 | | Case4 | |
|---|---|---|---|---|---|---|---|---|
| | Q1 | Q0 | Q1 | Q0 | Q1 | Q0 | Q1 | Q0 |
| 11 | 0 | 1 | 0 | 1 | 1 | 0 | 1 | 1 |
| 10 | 1 | 0 | 1 | 0 | 0 | 1 | 0 | 1 |
| 01 | 0 | -1 | -1 | 0 | 0 | -1 | -1 | 0 |
| 00 | -1 | 0 | 0 | -1 | -1 | 0 | 0 | -1 |

Detector output

Differential Comparator output (F_DIFF)

| | | |
|---|---|---|
| 11 | 0 | |
| 10 | 1 | |
| 01 | 1 | |
| 00 | 0 | |

Common mode Detector output (F_CM)

| 11 | 1 | |
| 10 | 1 | |
| 01 | 0 | |
| 00 | 0 | |

Decoder

| Logic | D1<br>F_CM | D0<br>XNOR<br>(F_DIFF, F_CM) | D1<br>F_CM | D0<br>INV<br>(F_DIFF) | D1<br>F_CM | D0<br>F_DIFF | D1<br>F_CM | D0<br>XNOR<br>(F_DIFF, F_CM) |
|---|---|---|---|---|---|---|---|---|
| 11 | 1 | 1 | 1 | 1 | 1 | 1 | 1 | 1 |
| 10 | 1 | 0 | 1 | 0 | 1 | 0 | 1 | 0 |
| 01 | 0 | 1 | 0 | 1 | 0 | 1 | 0 | 1 |
| 00 | 0 | 0 | 0 | 0 | 0 | 0 | 0 | 0 |

FIG. 17A

| Input Data | Case5 | | Case6 | | Case7 | | Case8 | |
|---|---|---|---|---|---|---|---|---|
| | Q1 | Q0 | Q1 | Q0 | Q1 | Q0 | Q1 | Q0 |
| 11 | 0 | -1 | -1 | 0 | 0 | -1 | -1 | 0 |
| 10 | -1 | 0 | 0 | 1 | -1 | 0 | 0 | -1 |
| 01 | 0 | 1 | 1 | 0 | 0 | 1 | 1 | 0 |
| 00 | 1 | 0 | 0 | -1 | 1 | 0 | 0 | 1 |

Detector output

Differential Comparator output (F_DIFF)

| | Case5 | Case6 | Case7 | Case8 |
|---|---|---|---|---|
| 11 | 1 | 0 | 1 | 0 |
| 10 | 0 | 1 | 0 | 1 |
| 01 | 0 | 1 | 0 | 1 |
| 00 | 1 | 0 | 1 | 0 |

Common mode Detector output (F_CM)

| | Case5 | Case6 | Case7 | Case8 |
|---|---|---|---|---|
| 11 | 0 | 0 | 0 | 0 |
| 10 | 0 | 1 | 0 | 1 |
| 01 | 1 | 0 | 1 | 0 |
| 00 | 1 | 1 | 1 | 1 |

Decoder

| | Case5 | | Case6 | | Case7 | | Case8 | |
|---|---|---|---|---|---|---|---|---|
| Logic | D1 INV(F_CM) | D0 XOR(F_DIFF, F_CM) | D1 INV(F_CM) | D0 INV(F_DIFF) | D1 INV(F_CM) | D0 F_DIFF | D1 INV(F_CM) | D0 XNOR(F_DIFF, F_CM) |
| 11 | 1 | 1 | 1 | 1 | 1 | 1 | 1 | 1 |
| 10 | 1 | 0 | 1 | 0 | 1 | 0 | 1 | 0 |
| 01 | 0 | 1 | 0 | 1 | 0 | 0 | 0 | 1 |
| 00 | 0 | 0 | 0 | 1 | 0 | 1 | 0 | 0 |

| Input Data | Case9 | | Case10 | | Case11 | | Case12 | |
|---|---|---|---|---|---|---|---|---|
| | Q1 | Q0 | Q1 | Q0 | Q1 | Q0 | Q1 | Q0 |
| 11 | 0 | 1 | 0 | -1 | 0 | 1 | 0 | -1 |
| 10 | 0 | -1 | 0 | 1 | 0 | -1 | 0 | 1 |
| 01 | 1 | 0 | 1 | 0 | -1 | 0 | -1 | 0 |
| 00 | -1 | 0 | -1 | 0 | 1 | 0 | 1 | 0 |

Detector output

Differential Comparator output (F_DIFF)

| Input | Case9 | Case10 | Case11 | Case12 |
|---|---|---|---|---|
| 11 | 0 | 1 | 0 | 1 |
| 10 | 1 | 0 | 1 | 0 |
| 01 | 1 | 1 | 1 | 1 |
| 00 | 0 | 0 | 0 | 0 |

Common mode Detector output (F_CM)

| Input | Case9 | Case10 | Case11 | Case12 |
|---|---|---|---|---|
| 11 | 1 | 1 | 1 | 1 |
| 10 | 1 | 0 | 1 | 0 |
| 01 | 0 | 1 | 0 | 1 |
| 00 | 0 | 0 | 0 | 0 |

Decoder

| Logic | Case9 | | Case10 | | Case11 | | Case12 | |
|---|---|---|---|---|---|---|---|---|
| | D1 | D0 | D1 | D0 | D1 | D0 | D1 | D0 |
| | XOR | F_CM | XOR | F_DIFF | XOR | INV(F_CM) | XOR | INV(F_CM) |
| 11 | 1 | 1 | 1 | 1 | 1 | 1 | 1 | 1 |
| 10 | 1 | 0 | 1 | 0 | 1 | 0 | 1 | 0 |
| 01 | 0 | 1 | 0 | 1 | 0 | 1 | 0 | 1 |
| 00 | 0 | 0 | 0 | 0 | 0 | 0 | 0 | 0 |

FIG. 17D

| Input Data | Case13 | | Case14 | | Case15 | | Case16 | |
|---|---|---|---|---|---|---|---|---|
| | Q1 | Q0 | Q1 | Q0 | Q1 | Q0 | Q1 | Q0 |
| 11 | 1 | 0 | 1 | 0 | -1 | 0 | -1 | 0 |
| 10 | -1 | 0 | -1 | 0 | 1 | 0 | 1 | 0 |
| 01 | 0 | 1 | 0 | -1 | 0 | 1 | 0 | -1 |
| 00 | 0 | -1 | 0 | 1 | 0 | -1 | 0 | 1 |

Differential Comparator output (F_DIFF)

| | 1 | 1 | 1 | 1 | 0 | 0 | 0 | 0 |
|---|---|---|---|---|---|---|---|---|
| 11 | 1 | 1 | 1 | 1 | 0 | 0 | 0 | 0 |
| 10 | 0 | 0 | 0 | 0 | 1 | 1 | 1 | 1 |
| 01 | 0 | 0 | 1 | 1 | 0 | 0 | 1 | 1 |
| 00 | 1 | 1 | 0 | 0 | 1 | 1 | 0 | 0 |

Common mode Detector output (F_CM)

| | 1 | 1 | 1 | 1 | 0 | 0 | 0 | 0 |
|---|---|---|---|---|---|---|---|---|
| 11 | 1 | 1 | 1 | 1 | 0 | 0 | 0 | 0 |
| 10 | 0 | 0 | 1 | 1 | 1 | 1 | 0 | 0 |
| 01 | 1 | 1 | 0 | 0 | 0 | 0 | 1 | 1 |
| 00 | 0 | 0 | 0 | 0 | 1 | 1 | 1 | 1 |

Detector output

| Logic | D1 | D0 | D1 | D0 | D1 | D0 | D1 | D0 |
|---|---|---|---|---|---|---|---|---|
| | XNOR | F_CM | XNOR | F_DIFF | XNOR | INV(F_DIFF) | XNOR | INV(F_CM) |
| 11 | 1 | 1 | 1 | 1 | 1 | 1 | 1 | 1 |
| 10 | 1 | 0 | 1 | 0 | 1 | 0 | 1 | 0 |
| 01 | 0 | 1 | 0 | 1 | 0 | 1 | 0 | 1 |
| 00 | 0 | 0 | 0 | 0 | 0 | 0 | 0 | 0 |

Decoder

DATA TRANSMISSION DEVICES WITH EFFICIENT TERNARY-BASED DATA TRANSMISSION CAPABILITY AND METHODS OF OPERATING SAME

This application claims the benefit of Korean Patent Application No. 10-2019-0140135, filed Nov. 5, 2019 in the Korean Intellectual Property Office, the disclosure of which is hereby incorporated herein by reference.

BACKGROUND

The present disclosure relates to data transmission devices, including integrated circuit memory devices, and methods of operating same.

In general, a semiconductor memory device, which has been widely used in a high-performance electronic system, is increasing in capacity and speed. As an example of a semiconductor memory device, a dynamic random-access memory (DRAM) is a volatile memory and determines data based on charged stored in a capacitor.

SUMMARY

Example embodiments provide a data transmission device with reduced power consumption, a memory device including the data transmission device, and an operating method of the data transmission device.

According to some embodiments of the invention, a data transmission device includes first and second lines, and a transmitter, which is configured to convert received binary data into ternary data and output the ternary data onto the first and second lines by toggling only one of the first and second lines during each of a plurality of consecutive 2-bit data transmission time intervals. A receiver is also provided, which is configured to convert the ternary data received from the first and second lines back into binary data.

In some of these embodiments, the transmitter may be configured to output the ternary data onto the first and second lines using return-to-zero toggling during each of the 2-bit data transmission time intervals. In addition, the transmitter may be configured to output each bit of the ternary data as a logic value within a group consisting of: −1, corresponding to a first voltage level, 0, corresponding to a second voltage level, and 1, corresponding to a third voltage level. In some embodiments, the first voltage level is less than the second voltage level, which is less than the third voltage level.

The receiver may also be configured to convert four distinct combinations of the ternary data into respective ones of the following pairs of logic states: (0,0). (0,1), (1,0) and (1,1). Moreover, the receiver may include a decoder, which is configured to produce the binary data by performing an exclusive NOR operation on each of the pairs of logic states.

According to further embodiments of the invention, a method of transmitting data may include: (i) converting two consecutive bits of serially-received binary data into ternary data, which is provided onto a pair of signal lines using a return-to-zero toggling operation that is applied to only one of the pair of signal lines during each of a plurality of consecutive 2-bit data transmission time intervals, and then (ii) decoding the ternary data received on the pair of signal lines into binary data. And, during each of the 2-bit data transmission time intervals, only a first one of the pair of signal lines is driven at a +1 or −1 logic level while a second one of the pair of signal lines is driven at a reference logic level.

According to an additional embodiment, a data transmission device includes a first line, a second line, a transmitter configured to receive binary data, to convert the binary data into ternary data, and to output the converted ternary data to the first line and the second line. A receiver is also provided, which is configured to receive the ternary data through the first line and the second line and to convert the received ternary data into the binary data. In some of these embodiments, one of the first and second lines is not toggled when the ternary data are transmitted to the first and second lines.

According to another example embodiment, a memory device includes: a first transistor having a drain, connected to a power supply terminal, and a gate connected to a first local input/output line, a second transistor having a drain, connected to a source of the first transistor, and a gate connected to an inverted version of the first local input/output line, a third transistor having a drain connected to a source of the second transistor, a source connected to a ground terminal, and a gate receiving a local sense amplifier enable signal, a fourth transistor having a drain, connected to the source of the first transistor, and a gate connected to an inverted version of a second local input/output line, a fifth transistor having a drain connected to a source of the fourth transistor, a source connected to a first global input/output line, and a gate receiving the local sense amplifier enable signal, a sixth transistor having a drain, connected to the source of the first transistor, and a gate connected to a second local input/output line, and a seventh transistor having a drain connected to a source of the sixth transistor, a source connected to a second global input/output line, and a gate receiving the local sense amplifier enable signal.

According to yet another embodiment, a data transmission operating method includes converting binary data into ternary data using a code map in a transmitter and transmitting the converted ternary data through two lines in the transmitter. The code map maps the ternary data, corresponding to the binary data, using states in which the lines are not toggled simultaneously.

BRIEF DESCRIPTION OF DRAWINGS

The above and other aspects, features, and advantages of the present disclosure will be more clearly understood from the following detailed description, taken in conjunction with the accompanying drawings.

FIG. 16 illustrates a decoding table for a global input/output line according to an example embodiment.

FIGS. 17A, 17B, 17C, and 17D illustrate examples of a code map according to an example embodiment.

DETAILED DESCRIPTION

Hereinafter, example embodiments will be described with reference to the accompanying drawings.

Figure 1:
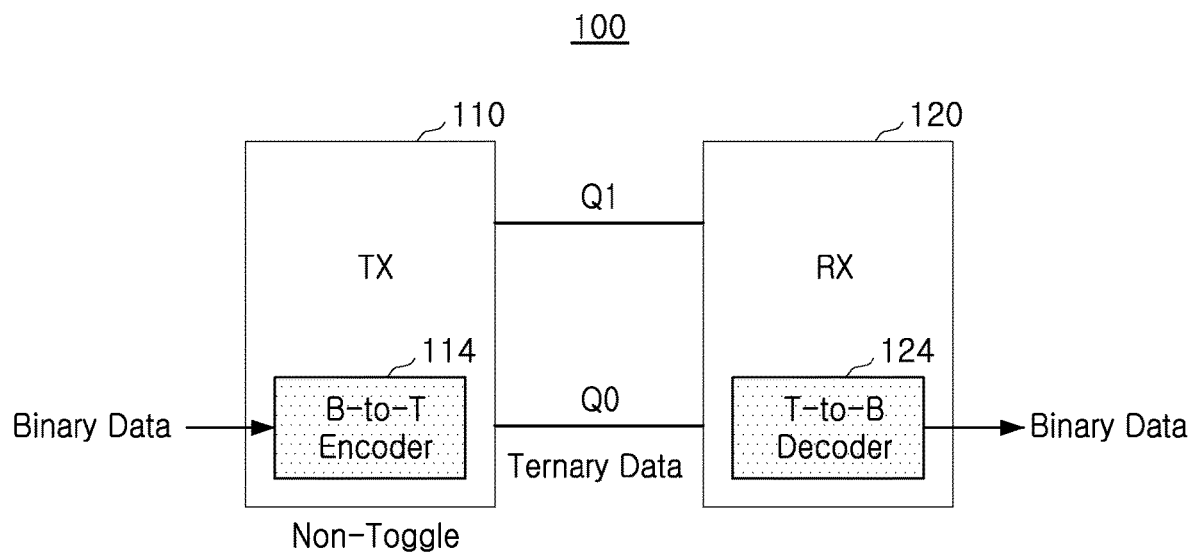
FIG. 1 illustrates a data transmission device according to an example embodiment.

FIG. 1 illustrates a data transmission device 100 according to an example embodiment. Referring to FIG. 1, the data transmission device 100 may include a transmitter 110 and a receiver 120. The transmitter (TX) 110 may be configured to receive binary data and to transmit a ternary code, corresponding to the binary data, through two lines Q0 and Q1. The ternary code may be represented by one of '−1,' '0,' and '1.' In an example embodiment, when the ternary data are '−1,' the ternary data may have a first level. When the ternary data are '0,' the ternary data may have a second level. When the ternary data are '1,' the ternary data may have a third level. The first level may be lower than the second level, the third level may be higher than the second level, and the second level may be a level of a reference voltage.

The transmitter 110 may include an encoder 114 receiving binary data and outputting a ternary code, corresponding to the binary data, using a code map. In an example embodiment, the code map may be set so as not to transmit data that causes the two lines Q0 and Q1 to simultaneously toggle.

The receiver (RX) 120 may be configured to receive a ternary code through the two lines Q0 and Q1 and to output binary data corresponding to the ternary code. The receiver 120 may include a decoder 124 receiving a ternary code and outputting binary data, corresponding to the ternary code, using a code map. The transmitter 110 and the receiver 120, illustrated in FIG. 1, may be implemented as a single integrated circuit, but this application is not be limited thereto. The transmitter 110 and the receiver 120 may be implemented as corresponding integrated circuits, respectively.

The data transmission device 100 according to an example embodiment may convert two bits of binary data into ternary data, and may transmit the converted ternary data to the two lines Q0, Q1 using a code map that supports a non-toggle case. Thus, the data transmission device 100 may decrease the number of toggling times.

Figure 2:
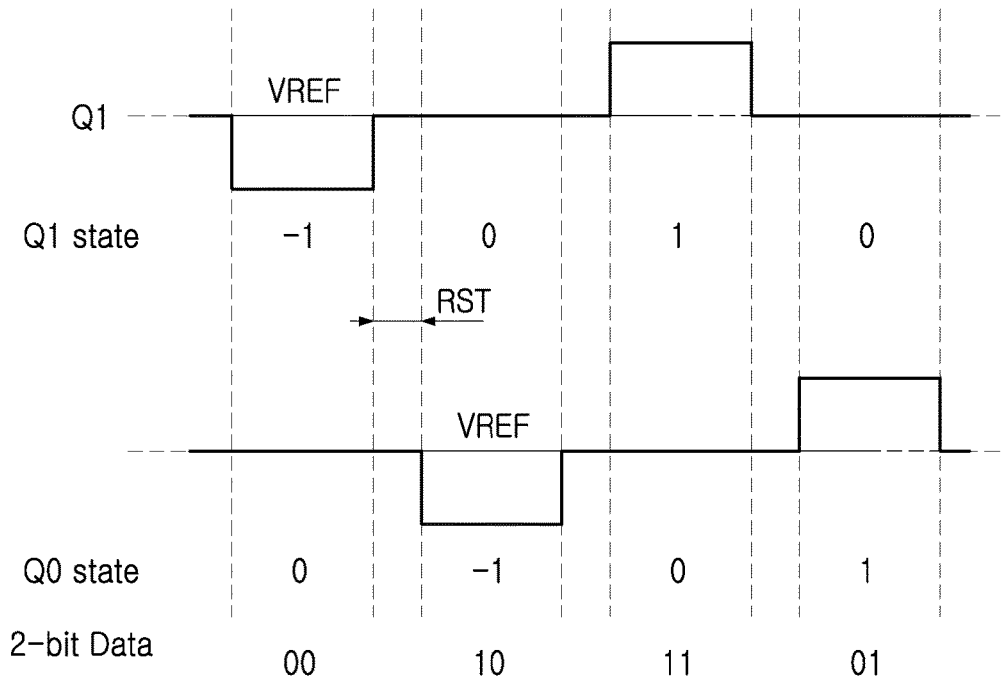
FIG. 2 illustrates data transmitted to two lines in a non-toggle case according to an example embodiment.

FIG. 2 illustrates data transmitted to the two lines Q0 and Q1 in a non-toggle case according to an example embodiment. Referring to FIG. 2, when the first line Q0 has the same level as a reference voltage VREF and the second line Q1 has a level lower than the reference voltage VREF, two bits of binary data may correspond to '00.' When the first line Q0 is the reference voltage VREF, ternary data are '0.' When the second line Q1 has a lower level than the reference voltage VREF, ternary data are '−1.' And, when the first line Q0 has a lower level than the reference voltage VREF and the second line Q1 has the same level as the reference voltage VREF, two bits of binary data may correspond to '10.' And, further, when the first line Q0 has the same level as the reference voltage VREF and the second line Q1 has a higher level than the reference voltage VREF, two bits of binary data may correspond to '11.' When the second line Q1 has a higher level than the reference voltage VREF, ternary data are '1.' Finally, when the first line Q0 has a higher level than the reference voltage VREF and the second line Q1 has the same level as the reference voltage VREF, two bits of binary data may correspond to '01.'

Data, transmitted in each of the two lines Q0 and Q1, may be a return-to-zero (RZ) signaling signal, as illustrated in FIG. 2. For example, a reset period RST is present after two bits of data are transmitted using a ternary code. A level of the reset period RST may be the level of the reference voltage VREF, but the present disclosure is not necessarily limited thereto. The data, transmitted in each of the two lines Q0 and Q1, may be a non-return-to-zero (NRZ) signaling signal. It will be understood that binary data, corresponding to ternary data non-toggled between the two lines Q0 and Q1 illustrated in FIG. 2, is merely an example.

Figure 3:
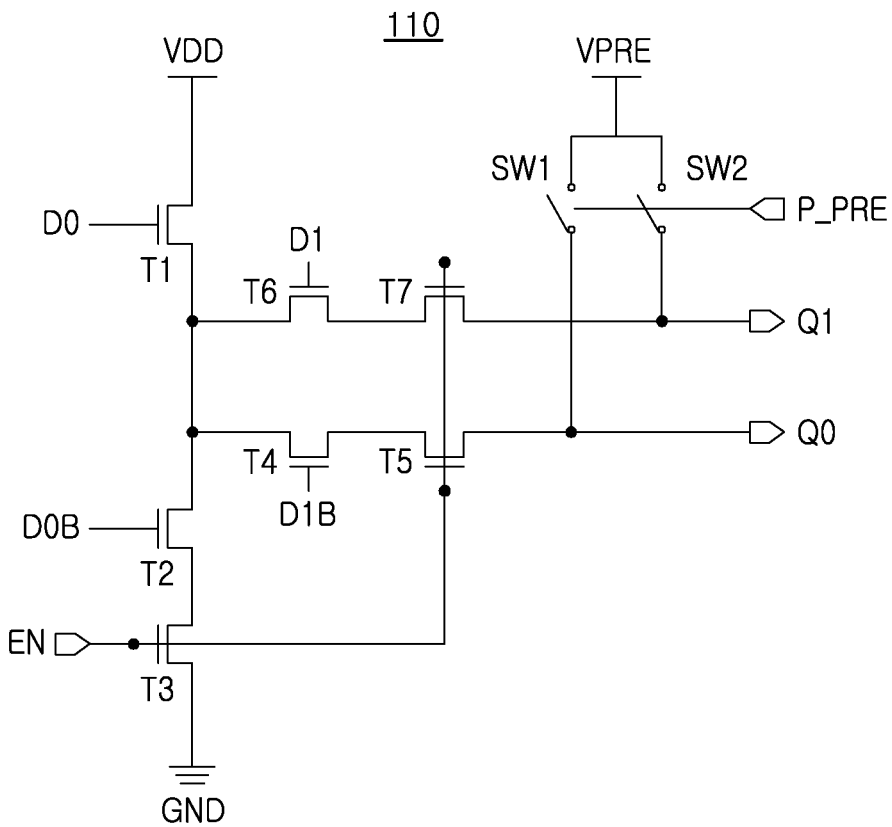
FIG. 3 illustrates a transmitter according to an example embodiment.

FIG. 3 illustrates a transmitter 110 according to an example embodiment. Referring to FIG. 3, the transmitter 110 may include transistors T1 to T7 and switches SW1 and SW2. For ease of description, in FIG. 3, it will be assumed that two bits of binary data include a first data bit D0 and a second data bit D1.

A first transistor T1 may have a drain, connected to a power supply terminal VDD, and a gate receiving the first data bit D0. A second transistor T2 may have a drain connected to a source of the first transistor T1, and a gate receiving an inverted version DOB of the first data bit D0. A third transistor T3 may have a drain connected to a source of the second transistor T2, a source connected to a ground terminal GND, and a gate receiving an enable signal EN. A fourth transistor T4 may have a drain, connected to a source of the first transistor T1, and a gate receiving an inverted version D1B of the second data bit D1. A fifth transistor T5 may have a drain connected to a source of the fourth transistor T4, a source connected to the first line Q0, and a gate receiving the enable signal EN. A sixth transistor T6 may have a drain connected to the source of the first transistor T1, and a gate receiving the second data bit D1. A seventh transistor T7 may have a drain connected to a source of the sixth transistor T6, a source connected to the second line Q1, and a gate receiving the enable signal EN.

The first switch SW1 may provide a precharge voltage VPRE to the first line Q0 in response to a precharge signal P_PRE. The second switch SW2 may provide the precharge voltage VPRE to the second line Q1 in response to the precharge signal P_PRE. It will be understood that the configuration of the transmitter 110, illustrated in FIG. 3, is merely an example according to an embodiment of the invention.

Figure 4:
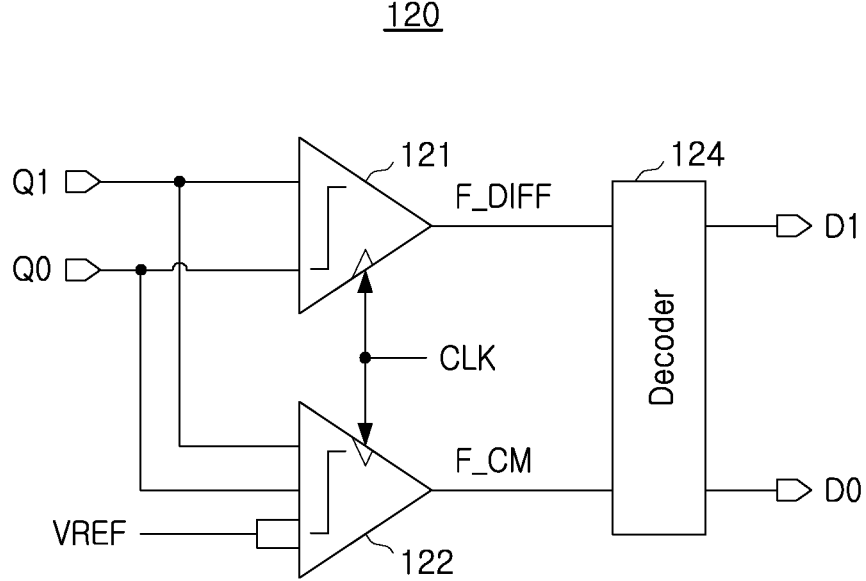
FIG. 4 illustrates a receiver according to an example embodiment.

FIG. 4 illustrates a receiver 120 according to an example embodiment. Referring to FIG. 4, the receiver 120 may include a first comparator 121, a second comparator 122, and a T-to-B decoder 124 (i.e., ternary-to-binary decoder).

The first comparator 121 may be configured to compare a voltage of a first line Q0 with a voltage of a second line Q1 and to output a first comparison voltage F_DIFF. The first comparison voltage F_DIFF may be a differential voltage. The first comparator 121 may be referred to as a differential latch (Q1-Q0).

The second comparator 122 may be configured to compare a common voltage Q0+Q1/2 of the voltage of the first line Q0 and the voltage of the second line Q1 with a reference voltage VREF and to output a comparison voltage F_CM. When binary data are transmitted using a ternary code, one of the voltage of the first line Q1 and the voltage of the second line Q1 may be the reference voltage VREF. In addition, the second comparison voltage F_CM may be a common mode voltage. The second comparator 122 may be referred to as a common mode detector ((Q0+Q1)/2). As shown, the first comparator 121 and the second comparator 122 may be activated in response to a clock signal CLK. The T-to-B decoder 124 may be configured to receive a first comparison voltage F_DIFF and a second comparison voltage F_CM and to output corresponding binary data to the first data line D0 and the second data line D1.

Figures 5, 6:
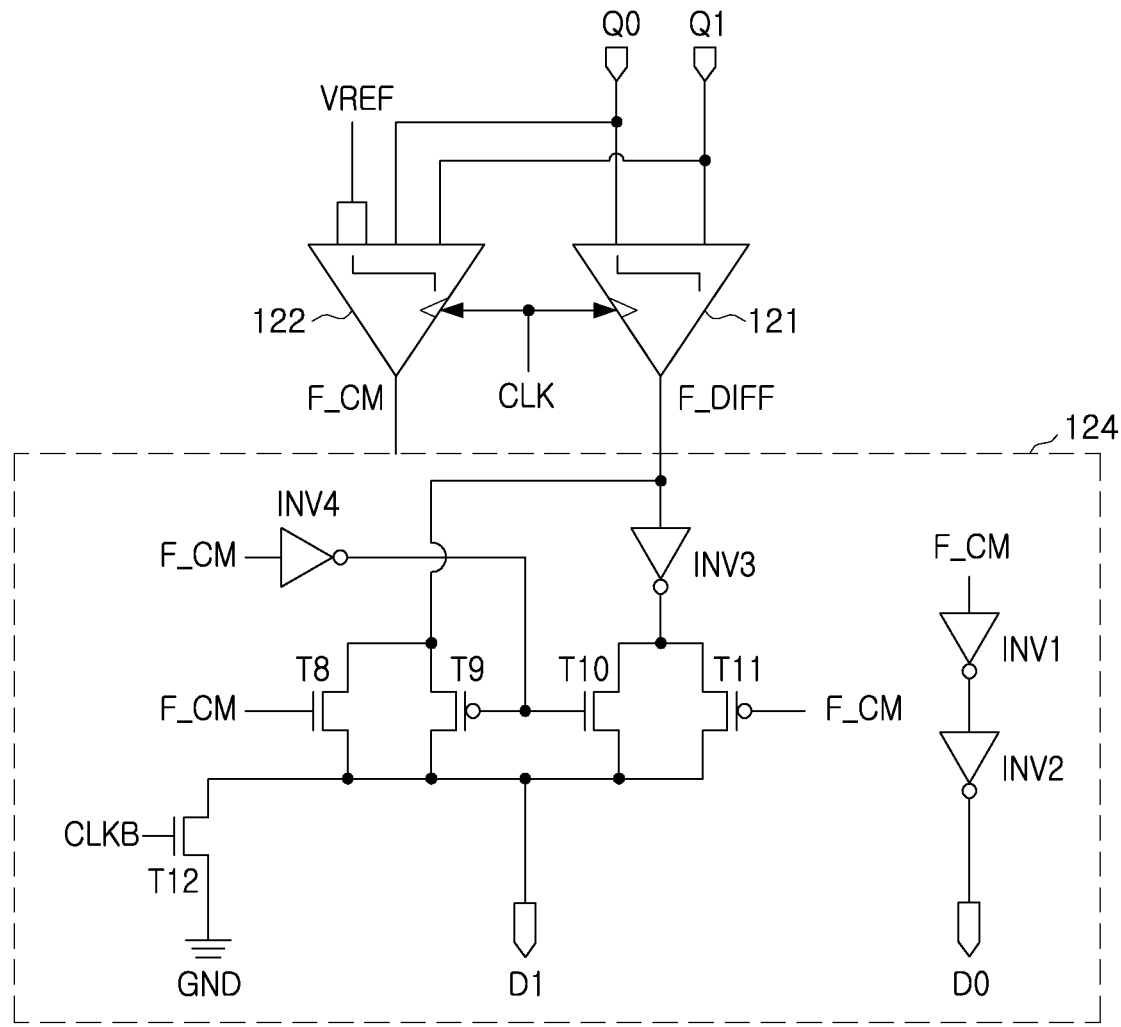
FIG. 5 illustrates a ternary-to-binary (T-to-B) decoder in FIG. 4.
FIG. 6 illustrates a table showing a decoding process of a receiver according to an example embodiment.

FIG. 5 illustrates the T-to-B decoder 124 in FIG. 4. Referring to FIG. 5, the T-to-B decoder 124 may include inverters INV1 to INV4 and transistors T8 to T12. A first inverter INV1 may receive a second comparison voltage V_CM and may invert a second comparison voltage V_CM. A second inverter INV2 may invert an output value of the first inverter INV1 and may transmit the inverted output value to a first data line D0. A third inverter INV3 may invert a first comparison voltage F_DIFF. A fourth inverter INV4 may invert a second comparison voltage F_CM. An eighth transistor T8 may have a drain receiving the first comparison voltage F_DIFF, a source connected to a second data line D1, and a gate receiving the second comparison voltage F_CM. A ninth transistor T9 may have a source receiving the first comparison voltage F_DIFF, a drain connected to the second data line D1, and a gate receiving an output value of the fourth inverter INV4. A tenth transistor T10 may have a drain receiving an output value of the third inverter INV3, a source connected to the second data line D1, and a gate receiving an output value of the fourth inverter INV4. An eleventh transistor T11 may have a source receiving an output value of the third inverter INV3, a drain connected to the second data line D1, and a gate receiving the second comparison voltage F_CM. A twelfth transistor 12 may have a drain connected to the second data line D1, a source connected to the ground terminal GND, and a gate receiving an inverted version CLKB of a clock CLK.

In an example embodiment, each of the eighth, tenth, and twelfth transistors T8, T10, and T12 may include an n-channel metal-oxide-silicon (NMOS) field effect transistor (FET), whereas each of the ninth and eleventh transistors T9 and T11 may include a p-channel metal-oxide-silicon (PMOS) field effect transistor (FET), as shown.

FIG. 6 illustrates a table showing a decoding process of a receiver 120 according to an example embodiment. Referring to FIG. 6, a bit of a first data line D0 may be a value corresponding to the second comparison voltage F_CM, and a bit of a second data line D1 may be a value obtained by performing an XNOR operation on a first comparison voltage F_DIFF and a second comparison F_CM.

When a code value of a first line Q0 is '1' and a code value of a second line Q1 is '0,' a value of the first comparison voltage F_DIFF is '0' and a value of the second comparison voltage F_CM is '1.' Accordingly, the decoded binary data (D1, D0) are '01.' And, when the code value of the first line Q0 is '−1' and the code value of the second line Q1 is '0,' the value of the first comparison voltage F_DIFF is '1' and the value of the second comparison voltage F_CM is '0.' Accordingly, the decoded binary data (D1, D0) are '00.' And, when the code value of the first line Q0 is '0' and the code value of the second line Q1 is '1,' the value of the first comparison voltage F_DIFF is '1' and the value of the second comparison voltage F_CM is '1.' Accordingly, the decoded binary data (D1, D0) are '11.' Finally, when the code value of the first line Q0 is '0' and the code value of the second line Q1 is '−1,' the value of the first comparison voltage F_DIFF is '0' and the value of the second comparison voltage F_CM is '0.' Accordingly, the decoded binary data are '10.'

Figure 7:
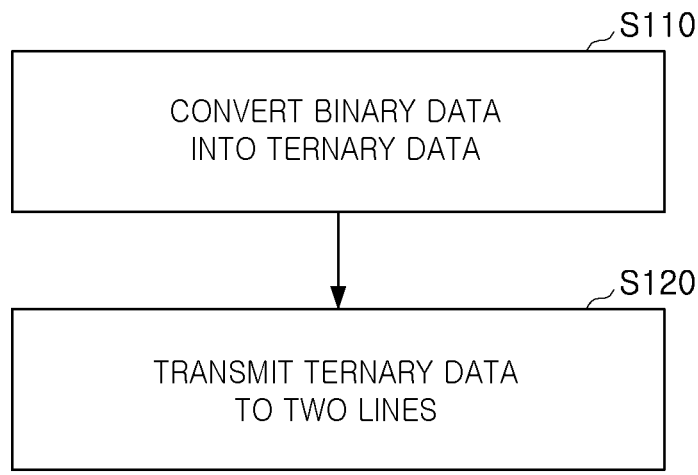
FIG. 7 is a flowchart illustrating an operating method of a transmitter according to an example embodiment.

FIG. 7 is a flowchart illustrating an operating method of a transmitter 110 according to an example embodiment. Referring to FIGS. 1 to 7, the operation of the transmitter 110 may will be described below. The transmitter 110 may receive binary data. The transmitter 110 may convert the received binary data into ternary data using a code map (S110). The converted ternary data may be transmitted through the two lines Q0 and Q1 (S120). The code map may be set so as not to generate data toggled between both the lines Q0 and Q1.

In a data transmission method according to an example embodiment, in the case in which two or more pins of serial data are transmitted, two bits of binary data are transmitted to two lines in a return-to-zero (RZ) manner after being converted into ternary data (−1,0,1). When both of the two lines are toggled, two bits of binary data may be transmitted using the other states except for a case in which both of the two lines are not toggled. Thus, when RZ transmission is performed by pair coding of two lines, the number of toggling times may be advantageously decreased by half as compared with binary RZ transmission.

Figure 8:
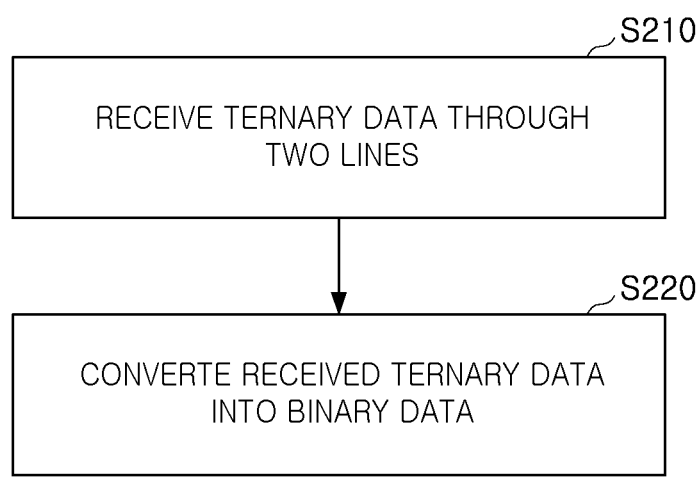
FIG. 8 is a flowchart illustrating an operating method of a receiver according to an example embodiment.

FIG. 8 is a flowchart illustrating an operating method of a receiver 120 according to an example embodiment. Referring to FIGS. 1 to 8, the operating method of the receiver 120 may will be described below. The receiver 120 may receive ternary data through the two lines Q0 and Q1 (S210). The receiver 120 may convert the received ternary data into binary data using a code map (S220). A data transmission scheme according to an example embodiment may be used to transmit internal data of a dynamic random-access memory (DRAM). For example, the data transmission scheme of this application may be applied to GIO signaling in the DRAM.

Figure 9:
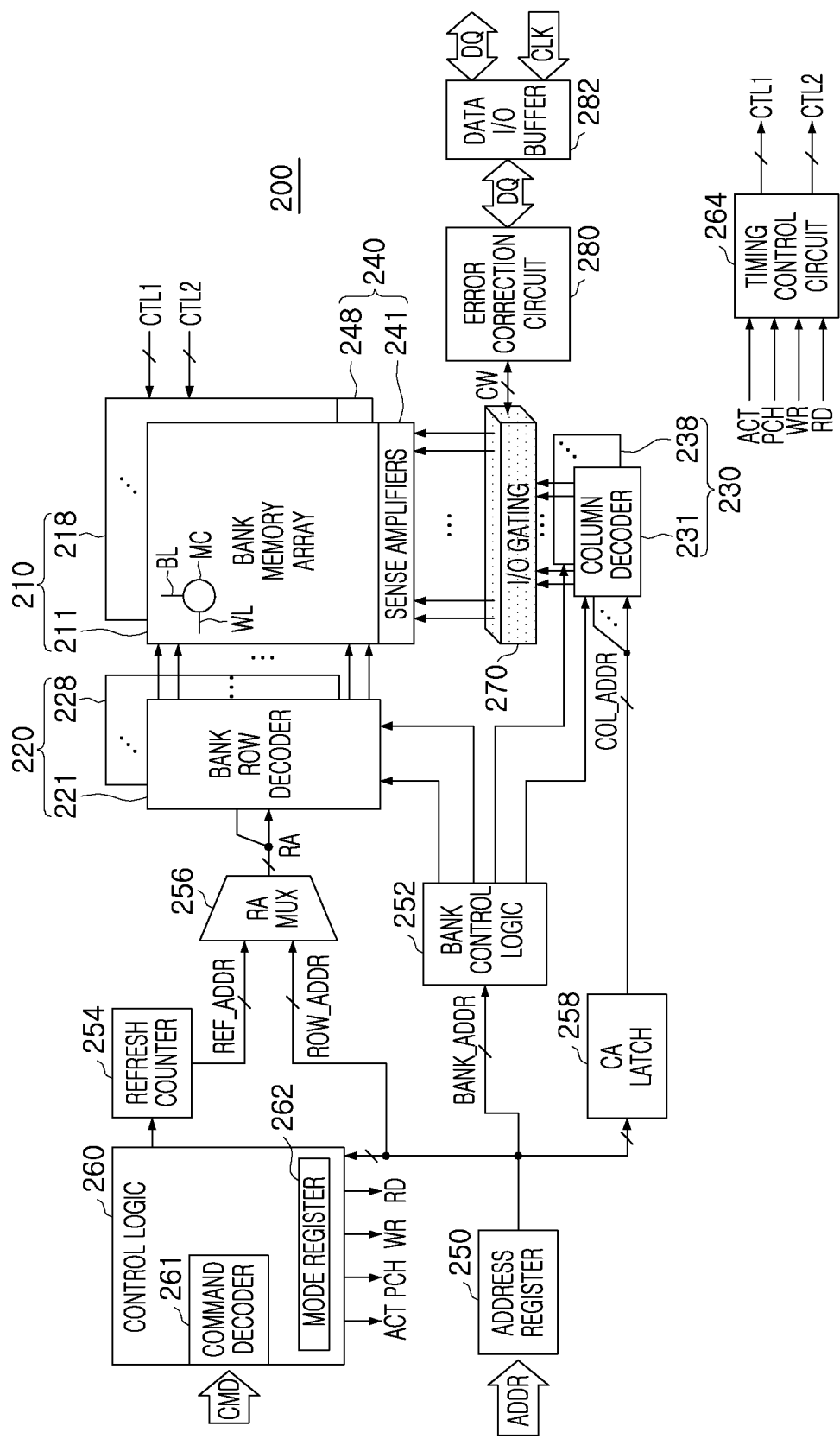
FIG. 9 illustrates a memory device according to another example embodiment.

FIG. 9 illustrates a memory device 200 according to another example embodiment. Referring to FIG. 9, the memory device 200 may include a memory cell array 210, a row decoder 220, a column decoder 230, a sense amplifier circuit 240, an address register 250, a bank control logic 252, a refresh counter 254, a row address multiplexer 256, a column address latch 258, a control logic 260, a timing control circuit 264, an input/output (I/O) gating circuit 270, an error correction circuit 280, and a data input/output (I/O) buffer 282.

The memory cell array 210 may include first to eighth bank arrays 211 to 218. It will be understood that the number of bank arrays, constituting the memory cell array 210, is not limited thereto. The row decoder 220 may include first to eighth bank row decoders 221 to 228, respectively connected to the first to eighth bank arrays 211 to 218. The column decoder 230 may include first to eighth bank column decoders 231 to 238, respectively connected to the first to eighth bank arrays 211 to 218. The sense amplifier circuit 240 may include first to eighth bank sense amplifiers 241 to 248, respectively connected to the first to eighth bank arrays 211 to 218. The first to eighth bank arrays 211 to 218, the first to eighth bank row decoders 221 to 228, the first to eighth bank column decoders 231 to 238, and the first to eighth bank sense amplifiers 241 to 248 may constitute first to eighth banks, respectively. Each of the first to eighth bank arrays 211 to 218 may include a plurality of memory cells MC formed at intersections of word lines WL and bitlines BL.

The address register 250 may receive and store an address ADDR, having a bank address BANK_ADDR, a row address ROW_ADDR, and a column address COL_ADDR, from an external memory controller. The address register 250 may provide the received bank address BANK_ADDR to the bank control logic 252, may provide the received row address ROW_ADDR to the row address multiplexer 256, and may provide the received column address COL_ADDR to the column address latch 258.

The bank control logic 252 may generate bank control signals in response to the bank address BANK_ADDR. Among the first to eighth bank row decoders 221 to 225, a bank row decoder corresponding to the bank address BANK_ADDR may be activated in response to the bank control signals. Among the first to eighth bank column decoders 231 to 238, a bank column decoder corresponding to the bank address BANK_ADDR may be activated in response to the bank control signals.

The row address multiplexer 256 may receive the row address ROW_ADDR from the address register 250 and may receive the refresh row address REF_ADDR from the refresh counter 254. The row address multiplexer 256 may selectively output the row address ROW_ADDR or the refresh row address REF_ADDR as a row address RA. The row address RA, output from the row address multiplexer 256, may be applied to each of the first to eighth bank row decoders 221 to 228.

Among the first to eighth bank row decoders 221 to 228, a bank row decoder activated by the bank control logic 252 may decode the row address RA, output from the row address multiplexer 256, to activate a wordline corresponding to the row address RA. For example, the activated bank row decoder may apply a wordline drive voltage to a word line corresponding to a row address.

The column address latch 258 may receive the column address COL_ADDR from the address register 250, and may temporarily store the received column address COL_ADDR. In addition, the column address latch 258 may gradually increase the received column address COL_ADDR in a burst mode. The column address latch 258 may apply the temporarily stored or gradually increased column address COL_ADDR to each of the first to eighth bank column decoders 231 to 238. Among the first to eighth bank column decoders 231 to 238, a bank column decoder activated by the bank control logic 252 may activate a sense amplifier, corresponding to the bank address BANK_ADDR and the column address COL_ADDR, through the input/output gating circuitry 270.

Each of input/output gating circuits of the input/output gating circuitry 270 may include an input data mask logic, read data latches configured to store data output from the first to eighth bank arrays 211 to 228, and write drivers configured to write data to the first to eighth bank arrays 211 to 218, together with circuits configured to gate input/output data. In addition, the input/output gate circuitry 270 may be implemented by the data transmission device 100, illustrated in FIGS. 1 to 6, and a data transmission scheme thereof.

A codeword CW to be read in one bank array among the first to eighth bank arrays 211 to 218 may be sensed by a sense amplifier corresponding to the one bank array, and may be stored in read data latches. The codeword CW, stored in the read data latches, may be provided to a memory controller through the data input/output buffer 282 after being ECC-decoded by the error correction circuit 280. Data DQ to be written to one bank array among the first to eighth bank arrays 210 to 218 may be written to the one bank array through write drivers after being ECC-encoded by the error correction circuit 280.

The data input/output buffer 282 may provide the data DQ to the error correction circuit 280 during a write operation based on a clock signal CLK provided from the memory controller, and may provide the data DQ to the memory controller provided from the error correction circuit 280 during a read operation.

The error correction circuit 280 may generate parity bits based on data bits of the data DQ provided from the data input/output buffer 282 during the write operation and may provide the codeword CW, including the data DQ and the parity bits, to the input/output gating circuitry 270, and the input/output gating circuitry 270 may write the codeword CW to a bank array.

In addition, the error correction circuit 280 may receive the codeword CW, read from one bank array, from the input/output gating circuitry 270 during the read operation. The error correction circuit 280 may performs ECC decoding on the data DQ using the parity bits, included in the read codeword CW, to correct at least one error bit included in the data DQ and provide the corrected error bit to the input/output buffer 282.

The control logic circuit 260 may be configured to control an operation of the memory device 200. For example, the control logic circuit 260 may generate control signals such that the semiconductor memory device 200 performs a write operation or a read operation. The control logic circuit 260 may include a command decoder 261, configured to decode a command CMD received from a memory controller, and a mode register 262 configured to set an operating mode of the memory device 200.

For example, the command decoder 261 may decode a write enable signal /WE, a row address strobe signal /RAS, a column address strobe signal /CAS, a chip selection signal /CS, and the like, to generate operation control signals ACT, PCH, WE, and RD corresponding to the command CMD. The control logic circuit 260 may provide operation control signals ACT, PCH, WE, and RD to the timing control circuit 264. The control signals ACT, PCH, WR, and RD may include an active signal ACT, a precharge signal PCH, a write signal WR, and a read signal RD. The timing control circuit 264 may generate first control signal CTL1, controlling a voltage level of a wordline WL, and second control signals CTL2, controlling a voltage level of a bitline BL, in response to the operation control signals ACT, PCH, WR, and RD, and may provide the first control signals CTL1 and the second control signals CTL2 to the memory cell array 210.

Figure 10:
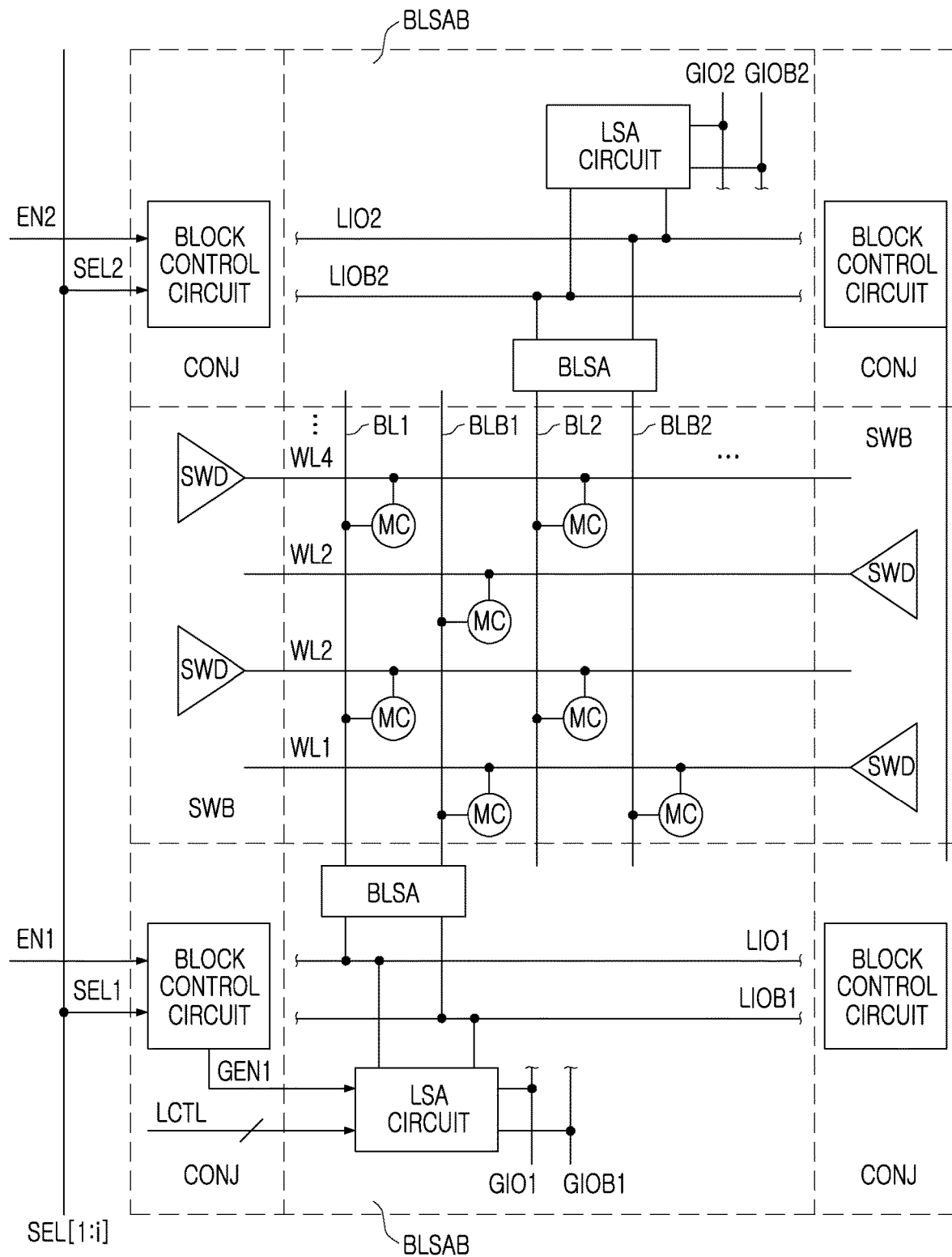
FIG. 10 is a detail view of a portion of a bank array illustrated in FIG. 9.

FIG. 10 is a detail view of a portion of a bank array illustrated in FIG. 9. Referring to FIGS. 9 and 10, a portion of a bank array includes a sub-array block SCB, bitline sense amplifier regions BLSA, sub-wordline driver regions SWB, and conjunction regions CONJ.

The sub-array block SCB may include a plurality of wordlines WL1 to WL4, extending in a row direction (a first direction), and a plurality of bitline pairs BL1 to BL2 and BLB1 to BLB2 extending in a column direction (a second direction). The sub-array block SCB may include memory cells MC disposed at intersections of the plurality of wordlines WL1 to WL4 and the plurality of bitline pairs BL1 to BL2 and BLB1 to BLB2.

The sub wordline driver regions SWB may include sub wordline drivers SWD, respectively configured to drive the wordlines WL1 to WL4. The sub-wordline drivers SWD may be alternately disposed on left and right sides of the sub-array block SCB.

The bitline sense amplifier region BLSAB may include bitline sense amplifiers BLSA and local sense amplifier circuits LSA connected to bitline pairs BL1 to BL2 and BLB1 to BLB2. The bitline sense amplifier BLSA may amplify a difference between the voltage levels sensed by the bitline pairs BL and BLB, and may provide the amplified difference to local input/output line pairs LIO and LIOB. The local sense amplifier circuit LSA may control a connection between the local input/output line pairs LIO1 and LIOB1 and the global input/output line pairs GIO1 and GIOB1 in response to a gated enable signal GEN1 and a local control signal LCTL.

The local sense amplifier circuit LSA may control a connection between the local input/output line pairs LIO2 and LIOB2 and the global input/output line pairs GIO2 and GIOB2 in response to a corresponding gated enable signal and a corresponding local control signal.

In an example embodiment, as shown in FIG. 8, the bitline sense amplifiers BLSA may be alternately disposed above and below the sub array block SCB. In an example embodiment, the conjunction regions CONJ may be disposed adjacent to the bitline sense amplifier regions BLSAB, the sub-wordline driver regions SWB, and the sub-array block SCB. Block control circuits may be disposed in the conjunction regions CONJ. The block control circuit may provide the gated enable signal GEN1 to the local sense amplifier circuit LSA in response to an enable signal EN1 and a selected signal SEL1. The local sense amplifier circuit LSA may selectively provide or block a connection to the global input/output line pairs GIO1 and GIOB1 in response to the gated enable signal GEN1. Although FIG. 10 illustrates a portion of a bank array in a folded bitline structure, the description associated with FIG. 10 may be substantially identically applied to an open bitline structure.

Figure 11:
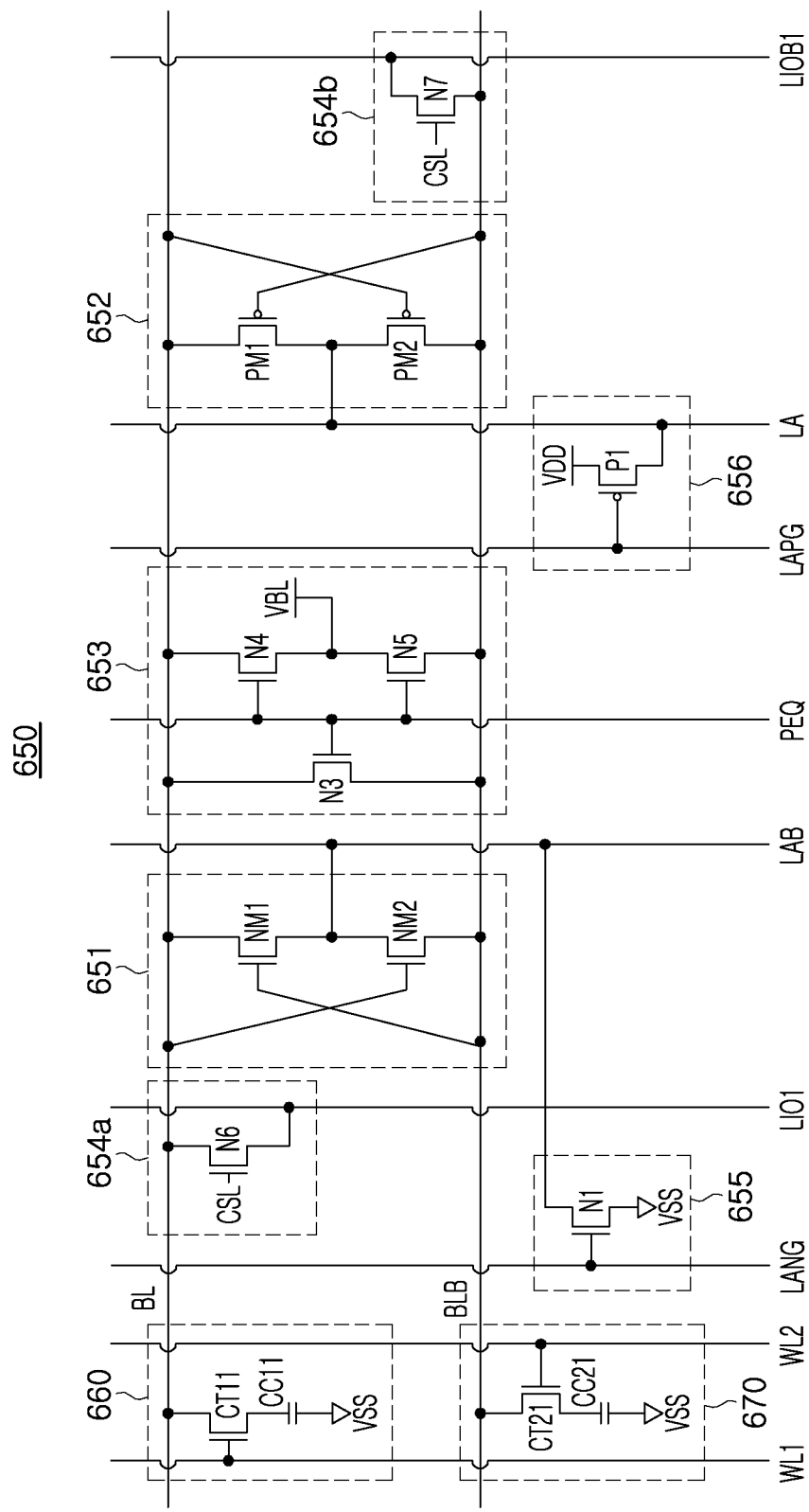
FIG. 11 illustrates a bitline sense amplifier illustrated in FIG. 10.

FIG. 11 illustrates the bitline sense amplifier BLSA illustrated in FIG. 10. Referring to FIG. 11, a bitline sense amplifier 650 may be connected to bitlines BL and BLB of each of the memory cells 660 and 670 included in the memory cell array. The bitline sense amplifier 650 may be include an N sense amplifier 651, a P sense amplifier 652, a precharge circuit 653, column select switches 654a and 654b, an NSA driver 655, and a PSA driver 656.

The N sense amplifier 651 may discharge a low potential bitline among the bitlines BL and BLB during a sensing operation. The N sense amplifier 651 may include NMOS transistors NM1 and NM2. A gate of the NMOS transistor NM1 may be connected to the bitline BLB, a drain of the NMOS transistor NM1 may be connected to the bitline BL, and a source of the NMOS transistor NM1 may be connected to a sense enable line LAB. A gate of the NMOS transistor NM2 may be connected to the bitline BL, a drain of the NMOS transistor NM2 may be connected to the bitline BLB, and a source of the NMOS transistor NM2 may be connected to the sense enable line LAB. The N sense amplifier 651 may discharge a low potential bitline with a ground voltage VSS provided to the sense enable line LAB. The low potential bitline may be one of the bitlines BL and BLB depending on data stored in the memory cells 660 and 670.

The P sense amplifier 652 may charge a high potential bitline, among the bitlines BL and BLB, to a power supply voltage (VDD) level during a sensing operation. The P sense amplifier 652 may include PMOS transistors PM1 and PM2. A gate of the PMOS transistor PM1 may be connected to a bitline BLB, a source of the PMOS transistor PM1 may be connected to the bitline BL, and a drain of the PMOS transistor PM1 may be connected to the sense enable line LA. A gate of the PMOS transistor PM2 may be connected to the bitline BL, a source of the PMOS transistor PM2 may be connected to the bitline BLB, and a drain of the PMOS transistor PM2 may be connected to the sense enable line LA. The P sense amplifier 652 may charge a high potential bitline, among the bitlines BL and BLB, with the power supply voltage VDD provided to the sense enable line LA. In this case, a charging voltage VDD, provided from the PSA driver 656, may be provided to the sense enable line LA to turn off the transistor PM2 having a gate connected to the bitline BL on which a voltage increased by charge sharing.

Figure 12:
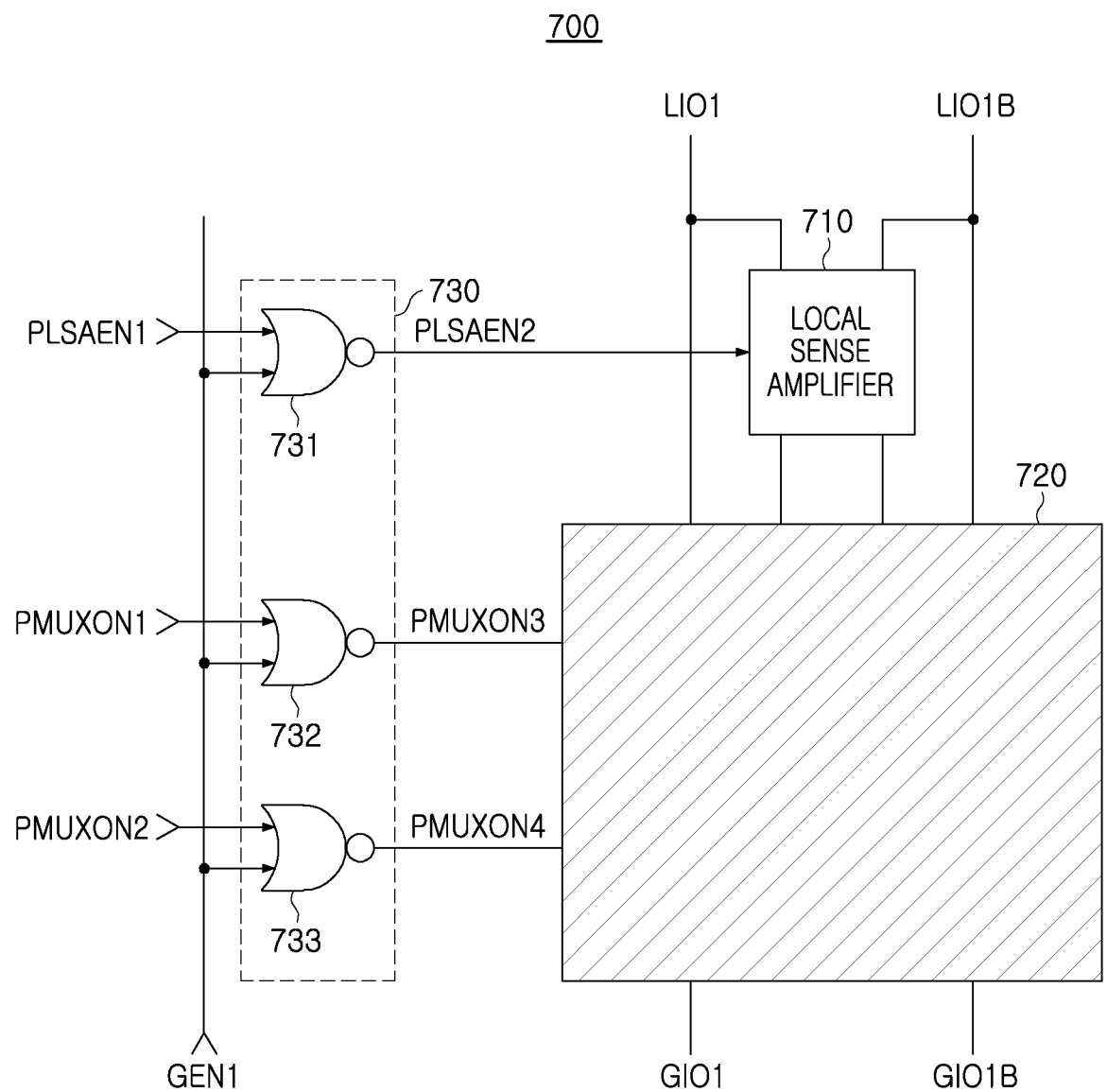
FIG. 12 illustrates a local sense amplifier circuit illustrated in FIG. 11.

FIG. 12 illustrates the local sense amplifier circuit LSA illustrated in FIG. 11. Referring to FIG. 12, a local sense amplifier circuit 700 may include a local sense amplifier 710, a local input/output line controller 720, and an activation control circuit 730. The activation control circuit 730 may perform an exclusive OR (XOR) operation on a first local sense enable signal PLSAEN1, a first connection control signal PMUXON1, a second connection control signal PMUXON2 with a gated enable single GEN1 to output a second local sensing enable signal PLSAEN2, a third connection control signal PMUXON3, and a fourth connection control signal PMUXON2.

Accordingly, depending on a logic level of the gated enable signal GEN1, logic levels of the first local sensing enable signal PLSAEN1, the first connection control signal PMUXON1, and the second connection control signal PMUXON2 may be maintained or inverted and may be provided as the second local sensing enable signal PLSAEN2, the third connection control signal PMUXON3, and the fourth connection control signal PMUXON2. The activation control circuit 730 may have first to third XOR gates 731, 732, and 733.

The local sense amplifier 710 may amplify a difference in voltage between a local input/output line pair LIO1 and LIOB1 in response to the second local sense enable signal PLSAEN2 and may transmit data, corresponding to the amplified voltage difference, to the global inputs/outputs data line pair GIO1 and GIOB1.

The local input/output line controller 720 may include first to fourth NMOS transistors 721, 722, 723, and 724, and may control a connections between the local input/output line pairs LIO1 and LIOB1 and the global input/output line pairs GIO1 and GIOB1 in response to a third connection control signal PMUXON3 and a fourth connection control signal PMUXON2.

In an example embodiment, when each of the first local sensing enable signal PLSAEN1, the first connection control signal PMUXON1 and the second connection control signal PMUXON2 has a high level and the gated enable signal GEN1 has a high level, each of the second local sensing enable signal PLSAEN2, the third connection control signal PMUXON3, and the fourth connection control signal PMUXON2 may have a low level. Accordingly, the local sense amplifier 710 is deactivated and the local input/output line controller 720 may block the connection between the local input/output line pair LIO1 and LIOB1 and the global input/output line pair GIO1 and GIOB1.

In an example embodiment, when each of the first local sensing enable signal PLSAEN1, the first connection control signal PMUXON1, and the second connection control signal PMUXON2 has a high level and the gated enable signal GEN1 has a low level, each of the second local sensing enable signal PLSAEN2, the third connection control signal PMUXON3, and the fourth connection control signal PMUXON2 may have a high level. Accordingly, the local sense amplifier 710 may be activated, and the local input/output line controller 720 may provide a connection between the local input/output line pair LIO1 and LIOB1 and the global input/output line pair GIO1 and GIOB1.

The data transmission method of this application may be applied to data transmitted through a global input/output line. Thus, 2-GIO may be ternary coded to be represented as two bits, which will be referred to as a multi-level single global input/output line (a multi-level single GIO).

Figure 13:
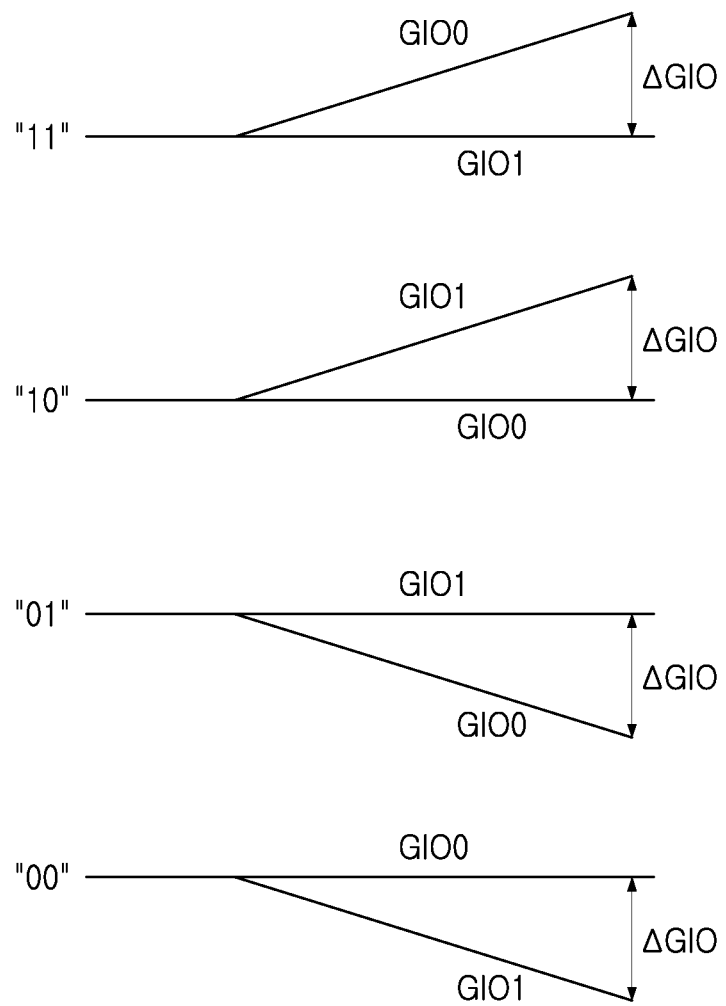
FIG. 13 illustrates ternary data transmitted to global input/output lines according to an example embodiment.

FIG. 13 illustrates ternary data transmitted to global input/output lines GIO0 and GIO1 according to an example embodiment. Referring to FIG. 13, binary data '11' may be represented as the first global input/output line GIO0 has a gradually increasing level, and the second global input/output line GIO1 is maintained at a constant level. Binary data '10' may be represented as the first global input/output line GIO0 is maintained at a constant level and the second global input/output line GIO1 has a gradually increasing level. Binary data '01' may be represented as first global input/output line GIO0 has a gradually decreasing level and the second global input/output line GIO1 is maintained at a constant level. Binary data '00' may be represented as the first global input/output line GIO0 has a constant level and the second global input/output line GIO1 has a gradually decreasing level.

As illustrated in FIG. 13, a difference in voltage GIO between the first global input/output line GIO0 and the second global input/output line GIO1 may be used to distinguish data, and one of the first global input/output line GIO0 and the second global input/output line GIO1 is always non-toggled.

Figure 14:
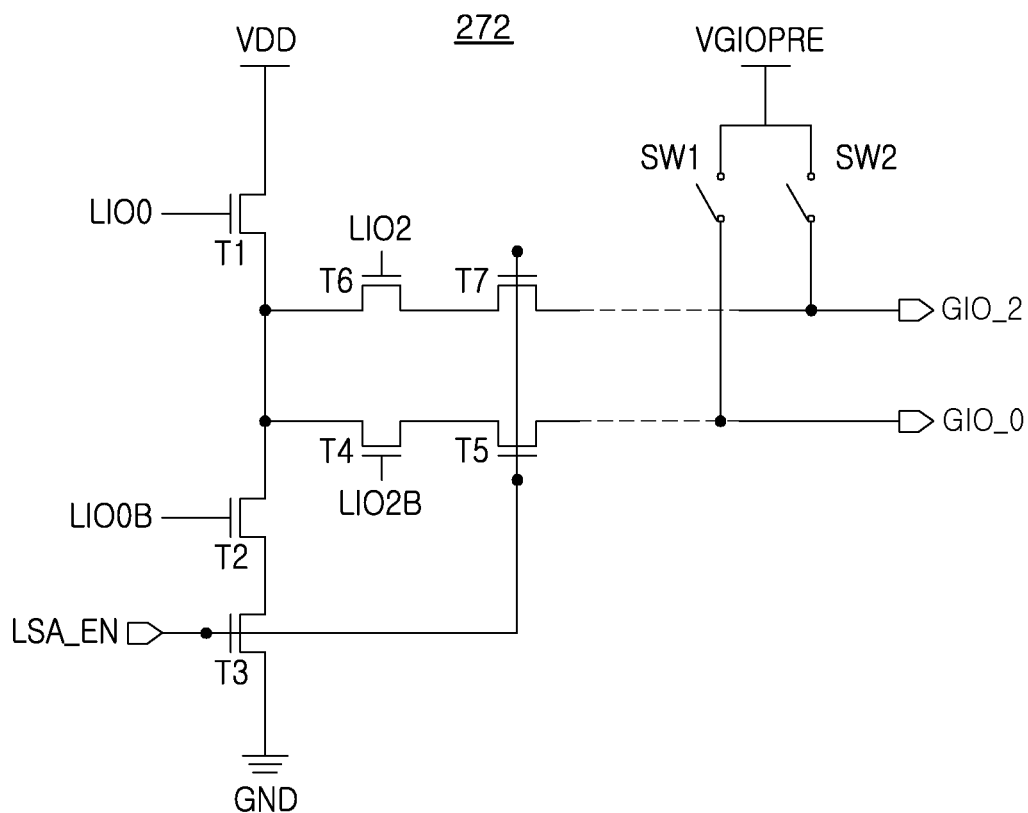
FIG. 14 illustrates a transmitter for global input/output line signaling according to an example embodiment.

FIG. 14 illustrates a transmitter 272 for global input/output line signaling according to an example embodiment. Referring to FIG. 14, the transmitter 272 may be implemented in the same manner as the transmitter 110 illustrated in FIG. 3. Unlike in FIG. 3, in FIG. 14, binary data are local input/output data LIO0 and LIG2, and ternary data corresponding to the local input/output data may be provided to global input/output lines GIO_0 and GIO_2.

The transmitter 272 according to an example embodiment may include a first transistor T1 having a drain connected to a power supply terminal VDD, a second transistor T2 having a drain connected to a source of the first transistor T1 and a gate connected to an inverted version LIO0B of the first local input/output line LIO0, a third transistor T3 having a drain connected to a source of the second transistor T2, a source connected to a ground terminal GND, and a gate receiving a local sense amplifier enable signal LSA_EN, a fourth transistor T4 having a drain connected to the source of the first transistor T1 and a gate connected to an inverted version LIO2B of the second local input/output line LIO2, a fifth transistor T5 having a drain connected to a source of the fourth transistor T4, a source connected to the first global input/output line GIO_0, and a gate receiving the local sense amplifier enable signal LSA_EN, a sixth transistor T6 having a drain connected to the source of the first transistor T1 and a gate connected to the second local input/output line LIO2, and a seventh transistor T7 having a drain connected to a source of the sixth transistor T6, a source connected to the second global input/output line GIO_2, and a gate receiving the local sense amplifier enable signal LSA_EN. In an example embodiment, each of the first to seventh transistors T1 to T7 may include an NMOS transistor.

In an example embodiment, the transmitter 272 may further include a first switch SW1, configured to provide a global input/output line precharge voltage VGIOPRE to a first global input/output line GIO_0, and a second switch SW2 configured to provide the global input/output line precharge voltage VGIOPRE to a second global input/output line GIO_2.

Figure 15:
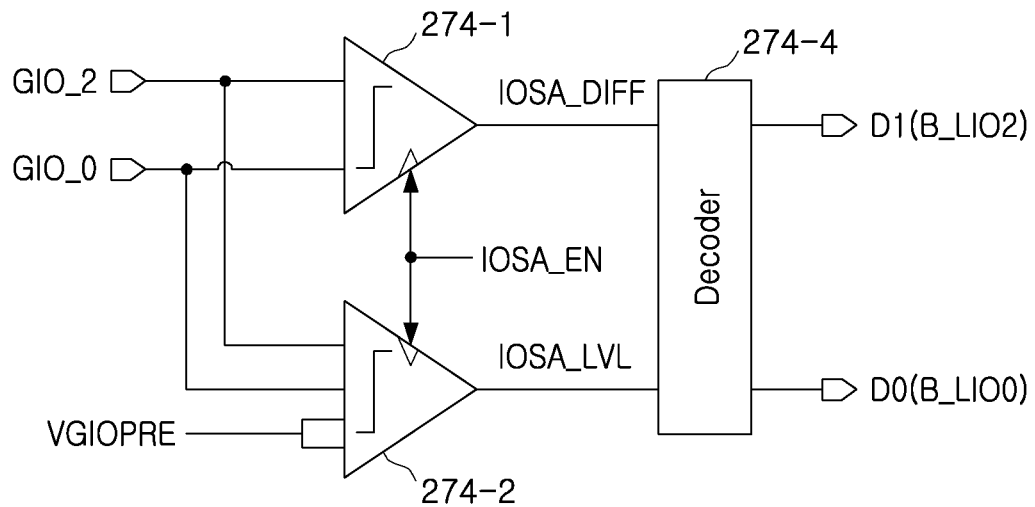
FIG. 15 illustrates a receiver for global input/output line signaling according to an example embodiment.

FIG. 15 illustrates a receiver 274 for global input/output line signaling according to an example embodiment. Referring to FIG. 15, the receiver 274 may be implemented in the same manner as the receiver 120 illustrated in FIG. 4. Unlike in FIG. 4, in FIG. 15, the receiver 274 receives ternary data from global input/output lines GIO_0 and GIO_2, and may perform a comparison operation in response to an enable signal IOSA_EN of an input/output sense amplifier to output binary data according to a comparison result.

The receiver 274 may include a differential comparator 274-1 configured to compare a first voltage of the first global input/output line GIO_0 and a second voltage of the second global input/output line GIO_2 with each other in response to the input/output sense amplifier enable signal IOSA_EN, a common mode detector 274-2 configured to compare a common voltage of the first voltage and the second voltage and a reference voltage with each other in response to the input/output sense amplifier enable signal IOSA_EN, and a decoder 274-4 configured to receive a first output value IOSA_DIFF of the differential comparator 274-1 and a second output value IOSA_LVL of the common mode detector 274-2 and to output a first bit D0 (B_LIO0) and a second bit D1 (B_LI02), respectively corresponding to first and second local input/output lines LIO0 and LIO2.

In an example embodiment, the decoder 274-4 may perform a NOR operation on the first output value IOSA_DIFF and the second output value IOSA_LVL to output the first bit B_LIO0 and to output the second bit B_LI02 corresponding to the second output value IOSA_LVL.

FIG. 16 illustrates a decoding table that summarizes operations performed by the transmitter and receiver logic of FIGS. 14-15, according to an embodiment of the invention. As shown, the four combinations of local input/output data LIO, LIO2 (i.e., (1,1), (0,1), (1,0) and (0,0)) are converted by the transmitter 272 into ternary data, as described hereinabove, which is provided to a pair of global input/output lines GIO_0, GIO_2 as the following "ternary" combinations: (0,1), (0, −1), (1,0) and (−1,0). As shown by FIGS. 15-16, these "ternary" combinations are converted by the receiver 274 into the following combinations of "intermediate" first and second output values IOSA_DIFF, IOSA_LVL: (0,1), (1,0), (1,1) and (0,0), which are then decoded into the following binary data signals D1, D0, where:

$$D1 = B\_LIO2 = IOSA\_LVL, \text{ and}$$

$$D0 = B\_LIO0 = XNOR(IOSA\_LVL, IOSA\_DIFF).$$

FIGS. 17A, 17B, 17C, and 17D illustrate examples of a code map according to an example embodiment. Referring to FIGS. 17A, 17B, 17C, and 17D, there may be 16 cases associated with mapping of ternary data to binary data.

A first case corresponds to the code map described in FIGS. 2 to 6. Ternary data transmitted to respective two lines Q0 and Q1 to correspond to binary data '11' are '0' and '1,' ternary data transmitted to the respective two lines Q0 and Q1 to correspond to binary data '10' are '1' and '0,' ternary data transmitted to the respective two lines Q0 and Q1 to correspond to binary data '01' are '−1' and '0,' and ternary data transmitted to the respective two lines Q0 and Q1 to correspond to binary data '00' are '0' and '−1.'

In a second case, ternary data transmitted to the respective two lines Q0 and Q1 to correspond to the binary data '11' are '1' and '0,' ternary data transmitted to the respective two lines Q0 and Q1 to correspond to binary '10' are '0' and '1,' ternary data transmitted to the respective two lines Q0 and Q1 to correspond to binary data '01' are '0' and '−1,' and ternary data transmitted on the respective two lines Q0 and Q1 to correspond to the binary data '00' are '−1' and '0.'

In a third case, ternary data transmitted to the respective two lines Q0 and Q1 to correspond to the binary data '11' are '0' and '1,' ternary data transmitted to the respective two lines Q0 and Q1 to correspond to binary data '10' are '1' and '0,' and ternary data transmitted to the respective two lines Q0 and Q1 to correspond to binary data '01' are '−1' and '0,' and ternary data transmitted on the respective two lines Q0 and Q1 to correspond to binary data '00' are '0' and '−1.'

In a fourth case, ternary data transmitted to the respective two lines Q0 and Q1 to correspond to the binary data '11' are '0' and '1,' and ternary data transmitted to the respective two lines Q0 and Q1 to correspond to binary data '10' are '1' and '0,' ternary data transmitted to the respective two lines Q0 and Q1 to correspond to binary data '01' are '0' and '−1,' and ternary data transmitted on the respective two lines Q0 and Q1 to correspond to binary data '00' are '−1' and '0.'

In a fifth case, ternary data transmitted to the respective two lines Q0 and Q1 to correspond to binary data '11' are '−1' and '0,' ternary data transmitted to the respective two lines Q0 and Q1 to correspond to binary data '10' are '0' and '−1,' ternary data transmitted to the respective two lines Q0 and Q1 to corresponds to binary data '01' are '1' and '0,' and ternary data transmitted to the respective two lines Q0 and Q1 to correspond to binary data '00' are '−1' and '0.'

In a sixth case, ternary data transmitted to the respective two lines Q0 and Q1 to correspond to binary data '11' are '0' and '−1,' and ternary data transmitted to the respective two lines Q0 and Q1 to correspond to the binary data '10' are '−1' and '0,' ternary data transmitted to the respective two lines Q0 and Q1 to correspond to the binary data '01' are '1' and '0,' and ternary data transmitted to the respective two lines Q0 and Q1 to correspond to the binary data '00' are '0' and '1.'

In a seventh case, ternary data transmitted to the respective two lines Q0 and Q1 to correspond to binary data '11' are '−1' and '0,' ternary data transmitted to the respective two lines Q0 and Q1 to correspond to binary data '10' are '0' and '−1,' ternary data transmitted to the respective two lines Q0 and Q1 to correspond to binary data '01' are '0' and '1,' and ternary data transmitted to the respective two lines Q0 and Q1 to correspond to binary data '00' are '1' and '0.'

In an eighth case, ternary data transmitted to the respective two lines Q0 and Q1 to correspond to the binary data '11' are '0' and '−1,' ternary data transmitted to the respective two lines Q0 and Q1 to correspond to binary data '10' are '−1' and '0,' ternary data transmitted to the respective two lines Q0 and Q1 to correspond to binary data '01' are '0' and '1,' and ternary data transmitted to the respective two lines Q0 and Q1 to correspond to binary data '00' are '1' and '0.'

In a ninth case, ternary data transmitted to the respective two lines Q0 and Q1 to correspond to the binary data '11' are '1' and '0,' and ternary data transmitted to the respective two lines Q0 and Q1 to correspond to binary data '10' are '−1' and '0,' ternary data transmitted the respective two lines Q0 and Q1 to correspond to binary data '01' are '0' and '1,' and ternary data transmitted to the respective two lines Q0 and Q1 to correspond to the binary data '00' are '0' and '−1.'

In a tenth case, ternary data transmitted to the respective two lines Q0 and Q1 to correspond to binary data '11' are '−1' and '0,' ternary data transmitted in the respective two lines Q0 and Q1 to correspond to binary data '10' are '1' and '0,' ternary data transmitted to the respective two lines Q0 and Q1 to correspond to binary data '01' are '0' and '1,' and ternary data transmitted to the respective two lines Q0 and Q1 to correspond to binary data '00' are '0' and '−1.'

In an eleventh case, ternary data transmitted to the respective two lines Q0 and Q1 to correspond to binary data '11' are '1' and '0,' ternary data transmitted to the respective two lines Q0 and Q1 to correspond to binary data '10' are '−1' and '0,' ternary data transmitted to the respective two lines Q0 and Q1 to correspond to binary data '01' are '0' and '−1,' and ternary data transmitted on the respective two lines Q0 and Q1 to correspond to the binary data '00' are '0' and '1.'

In a twelfth case, ternary data transmitted to the respective two lines Q0 and Q1 to correspond to binary data '11' are '−1' and '0,' ternary data transmitted in the respective two lines Q0 and Q1 to correspond to binary data '10' are '1' and '0,' ternary data transmitted to the respective two lines Q0 and Q1 to correspond to binary data '01' are '0' and '−1,' and ternary data transmitted to the respective two lines Q0 and Q1 to correspond to binary data '00' are '0' and '1.'

In a thirteenth case, ternary data transmitted to the respective two lines Q0 and Q1 to correspond to binary data '11' are '0' and '1,' ternary data transmitted to the respective two lines Q0 and Q1 to correspond to binary data '10' are '0' and '−1,' ternary data transmitted to the respective two lines Q0 and Q1 to correspond to binary data '01' are '1' and '0,' and ternary data transmitted to the respective two lines Q0 and Q1 to correspond to binary data '00' are '−1' and '0.'

In a fourteenth case, ternary data transmitted to the respective two lines Q0 and Q1 to correspond to binary data '11' are '0' and '1,' ternary data transmitted to the respective two lines Q0 and Q1 to correspond to binary data '10' are '0' and '−1,' ternary data transmitted to the respective two lines Q0 and Q1 to correspond to binary data '01' are '−1' and '0,' and ternary data transmitted on the respective two lines Q0 and Q1 to correspond to binary data '00' are '1' and '0.'

In a fifteenth case, ternary data transmitted to the respective two lines Q0 and Q1 to correspond to binary data '11' are '0' and '−1,' ternary data transmitted in the respective two lines Q0 and Q1 to correspond to binary data '10' are '0' and '1,' ternary data transmitted to the respective two lines Q0 and Q1 to correspond to binary data '01' '1' and '0,' and ternary data transmitted to the respective two lines Q0 and Q1 to correspond to binary data '00' are '−1' and '0.'

In a sixteenth case, ternary data transmitted to the respective two lines Q0 and Q1 to correspond to binary data '11' are '0' and '−1,' ternary data transmitted in the respective two lines Q0 and Q1 to correspond to binary data '10' are '0' and '1,' and ternary data transmitted to the respective two lines Q0 and Q1 to correspond to binary data '01' are '−1' and '0,' and ternary data transmitted to the respective two lines Q0 and Q1 to correspond to binary data '00' are '1' and '0.'

A logic circuit, constituting a decoder of a receiver, may include a first logic circuit configured to output a first data bit D0 and a second logic circuit configured to output a second data bit D1. The first logic circuit may include an inverter (INV) operator, and the second logic circuit may include an XOR operator, an XNOR operator, or an INV operator.

In a data receiving method of each of the cases, when the same signal-VREF is maintained in a receiver Rx, current consumption may be decreased by half to improve power efficiency twice, as compared with a pseudo-differential or single-ended method.

Figure 18:
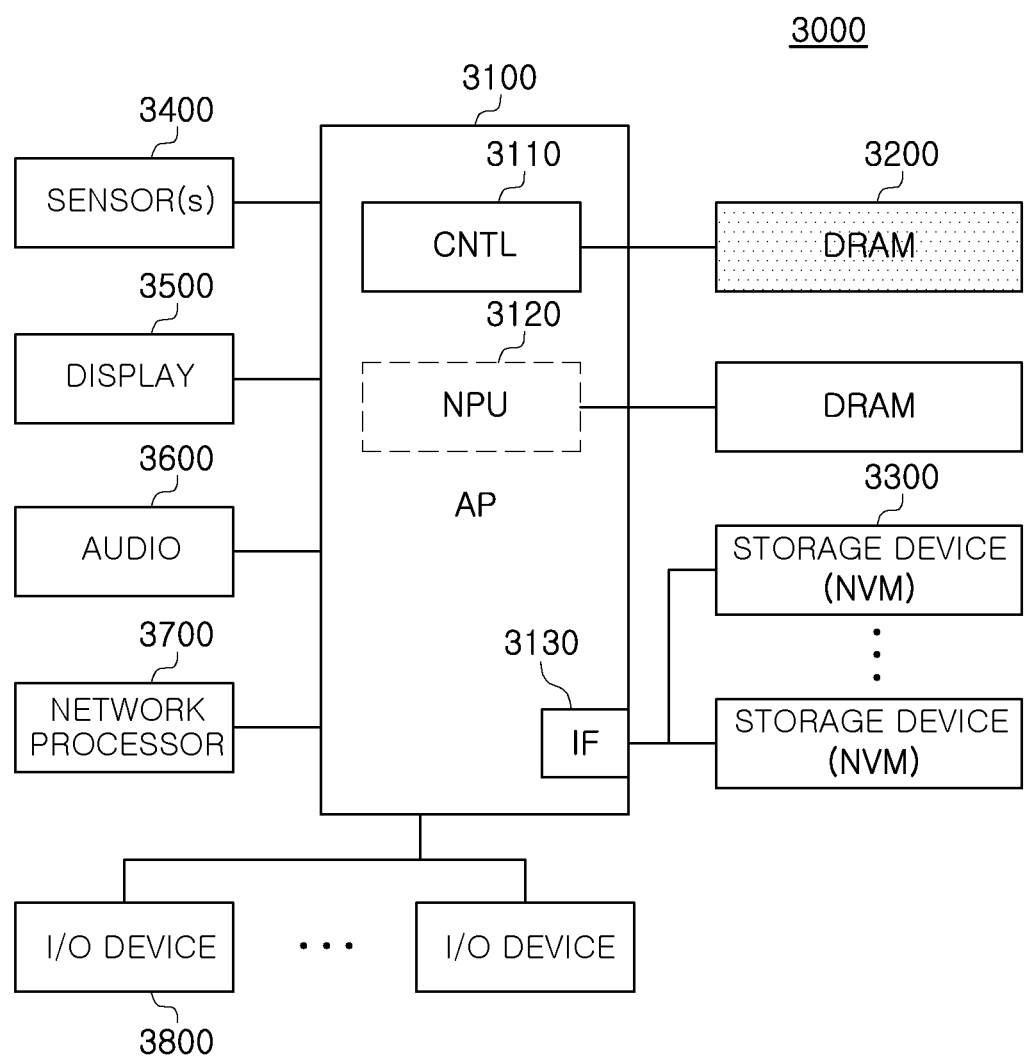
FIG. 18 illustrates a mobile device according to an example embodiment.

A memory device according to an example embodiment may be applied to a mobile device. For example, FIG. 18 illustrates a mobile device 3000 according to an example embodiment. Referring to FIG. 18, the mobile device 3000 may include an application processor 3100, at least one DRAM 3200, at least one storage device 3300, at least one sensor 3300, a display device 3400, and audio device 3500, a network processor 3600, and at least one input/output device 3700. For example, the mobile device 3000 may be implemented as a laptop computer, a mobile phone, a smartphone, a tablet personal computer (PC), or a wearable computer.

The application processor 3100 may be implemented to control the overall operation of the mobile device 3000. The application processor 3100 may execute applications such as a web browser, a game application, a video player, and the like.

According to example embodiments, the application processor 3100 may include a single core or multiple cores. For example, the application processor 3100 may be a multi-core processor such as a dual-core processor, a quad-core processor, a hexa-core processor, and the like. The application processor 3100 may further include an internal or external cache memory.

The application processor 3100 may include a controller 3110, a neural processing unit (NPU) 3120, and an interface 3130. In an example embodiment, the NPU 3120 may optionally be provided.

In an example embodiment, the application processor 3100 may be implemented as a system-on-chip (SoC). A kernel of an operating system, driven in the system-on-chip (SoC), may include a device driver configured to control an input/output (I/O) scheduler and the storage device 3300. The device driver may control access performance of the storage device 3300, or may control a CPU mode, a dynamic voltage and frequency scaling (DVFS) level, and the like, in the SoC with reference to the number of synchronous queues managed in the input/output scheduler.

The DRAM 3210 may be connected to a controller 3110. The DRAM 3210 may store data required for an operation of the application processor 3100. For example, the DRAM 3210 may temporarily store an operating system (OS) and application data, or may be used as an execution space of various software codes.

The DRAMs 3210 and 3220 may be configured to convert binary data into ternary data and to transmit the converted ternary data to two lines, as described above with reference to FIGS. 1 to 17. The DRAM 3210 has relatively greater latency and bandwidth (BW) than an I/O device or a flash memory. The DRAM 3210 may be initialized during mobile power-on, and may be used as a space, in which an OS and application data loaded and temporarily stored, or as a space in which various software codes are executed. The mobile system performs a multitasking operation of simultaneously loading several applications, and switching between applications and execution speed may be used as a performance index of the mobile system. The DRAM 3220 may be connected to NPU 3120. The DRAM 3220 may store data associated with artificial intelligence computation.

The storage device 3300 may be connected to an interface 3130. In an example embodiment, the interface 3130 may be driven by a communications protocol of one of double data rate (DDR), DDR2, DDR3, DDR4, low power DDR (LPDDR), universal serial bus (USB), multimedia card (MMC), embedded MMC, peripheral component interconnection (PCI), non-volatile memory express (NVMe), peripheral component interconnect express (PCIe), serial at attachment (SATA), small computer system interface (SCSI), serial attached SCSI (SAS), universal storage bus (USB) attached SCSI (UAS), internet small computer system interface (iSCSI), fiber channel, and fiber channel over ethernet (FCoE). In an example embodiment, a single storage device 3000 may be included in the mobile device 3000 in an embedded form. In another example embodiment, a single storage device 3000 may be removably included in the mobile device 3000.

The storage device 3300 may be configured to store user data. For example, the storage device 3300 may store data collected from a sensor 3400, or may store data network data, augmented reality (AR)/virtual reality (VR) data, and high-definition (HD) 4K contents. The storage device 3300 may include at least one nonvolatile memory device. For example, the storage device 3300 may include a solid state driver (SSD), an embedded multimedia card (eMMC), and the like.

In an example embodiment, the storage device 3300 may be implemented as an additional chip in the application processor 3100, or may be implemented in a single package with the application processor 3100.

In an example embodiment, the storage device 3300 may be mounted using various types of package. For example, the storage device 3300 may be mounted using packages such as Package on Package (PoP), Ball grid arrays (BGAs), Chip scale packages (CSPs), Plastic Leaded Chip Carrier (PLCC), Plastic Dual In-Line Package (PDIP), Die in Waffle Pack, Die in Wafer Form, Chip On Board (COB), Ceramic Dual In-Line Package (CERDIP), Plastic Metric Quad Flat Pack (MQFP), Thin Quad Flatpack (TQFP), Small Outline (SOIC), Shrink Small Packages such as Outline Package (SSOP), Thin Small Outline (TSOP), System In Package (SIP), Multi Chip Package (MCP), Wafer-level Fabricated Package (WFP), and Wafer-Level Processed Stack Package (WSP).

The sensor 3300 may be configured to sense an external environment of the mobile device 3000. In an example embodiment, the sensor 3300 may include an image sensor configured to senses an image. In this case, the sensor 3300 may transmit generated image information to the application processor 3100. In another example embodiment, the sensor 3300 may include a biosensor configured to detect biometric information. For example, the sensor 3300 may detect a fingerprint, an iris pattern, a blood vessel pattern, a heart rate, blood glucose, and the like, and may generate sensing data corresponding to the detected information. It will be understood that the sensor 3300 is not limited to the image sensor and the biosensor. The sensor 3300 of this application may include an arbitrary sensor such as an illuminance sensor, an acoustic sensor, an acceleration sensor, or the like.

The display device 3500 may be configured to output data. For example, the display device 3500 may output image data, sensed using the sensor 3300, or to output data calculated using the application processor 3100.

The audio device 3600 may be configured to output voice data to an external entity or to detect external voice.

The network processor 3700 may be configured to communicate with an external device in a wired or wireless communications scheme.

The input/output device 3800 may be configured to input data to the mobile device 3000 or to output data from the mobile device 3000. The input/output device 3800 may include devices, configured to provide digital input and output functions, such as a USB, a storage, a digital camera, an SD card, a touchscreen, a DVD, a modem, a network adapter, and the like.

The mobile device 3000 according to an example embodiment may transmit multi-level data so as not to be toggled simultaneously to achieve low current and low power.

The data transmission method and device in FIGS. 1 to 18 transmit a ternary code through two lines. However, transmission of the ternary code is not necessarily limited thereto. The data transmission device and method of this application may transmit a ternary code through three lines.

A method of converting binary data into ternary data and transmitting the converted ternary data has been described with reference to FIGS. 1 to 18. However, this application is not limited thereto. This application may extend to a method of converting binary data into multi-level data, other than ternary data, and transmitting the converted multi-level data.

As described above, according to example embodiments, ternary data non-toggled simultaneously may be transmitted to two lines to decrease the number of data lines and reduce power consumption during data transmission.

While example embodiments have been shown and described above, it will be apparent to those skilled in the art that modifications and variations could be made without departing from the scope of the present inventive concept as defined by the appended claims.

What is claimed is:

1. A data transmission device, comprising:
   first and second lines;
   a transmitter configured to convert received binary data into ternary data and output the ternary data onto the first and second lines by toggling only one of the first and second lines during each of a plurality of consecutive 2-bit data transmission time intervals; and
   a receiver configured to convert the ternary data received from the first and second lines into binary data.

2. The device of claim 1, wherein the transmitter is configured to output the ternary data onto the first and second lines using return-to-zero toggling during each of the 2-bit data transmission time intervals.

3. The device of claim 1, wherein the transmitter is configured to output each bit of the ternary data as a logic value within a group consisting of: −1, corresponding to a first voltage level, 0, corresponding to a second voltage level, and 1, corresponding to a third voltage level.

4. The device of claim 3, wherein the first voltage level is less than the second voltage level, which is less than the third voltage level.

5. The device of claim 3, wherein the receiver is configured to convert four distinct combinations of the ternary data into respective ones of the following pairs of logic states: (0,0), (0,1), (1,0) and (1.1).

6. The device of claim 5, wherein the receiver comprises a decoder, which is configured to produce the binary data by performing an exclusive NOR operation on each of the pairs of logic states.

7. A method of transmitting data, comprising:
   converting two consecutive bits of serially-received binary data into ternary data, which is provided onto a pair of signal lines using a return-to-zero toggling operation that is applied to only one of the pair of signal lines during each of a plurality of consecutive 2-bit data transmission time intervals; and
   decoding the ternary data received on the pair of signal lines into binary data.

8. The method of claim 7, wherein during each of the 2-bit data transmission time intervals only a first one of the pair of signal lines is driven at a +1 or −1 logic level while a second one of the pair of signal lines is driven at a reference logic level.

9. The method of claim 8, wherein during said decoding, four distinct combinations of the ternary data are converted into respective ones of the following pairs of logic states: (0,0), (0,1), (1,0) and (1,1).

10. The method of claim 7, wherein during said decoding, four distinct combinations of the ternary data are converted into respective ones of the following pairs of logic states: (0,0), (01), (1,0) and (1.1).

11. A data transmission device, comprising:
    a first line;
    a second line;
    a transmitter configured to receive binary data, to convert the binary data into ternary data, and to output the converted ternary data to the first line and the second line; and
    a receiver configured to receive the ternary data through the first line and the second line and to convert the received ternary data into the binary data,
    wherein one of the first and second lines is not toggled when the ternary data are transmitted to the first and second lines.

12. The data transmission device of claim 11, wherein the ternary data are transmitted in a return-to-zero manner.

13. The data transmission device of claim 11, wherein the ternary data are represented as one of '−1,' '0,' and '1,' the ternary data has a first level when the ternary data are '−1,' the ternary data has a second level when the ternary data are '0,' and the ternary data has a third level when the ternary data are '1'.

14. The data transmission device of claim 13, wherein the first level is lower than the second level,
    the third level is lower than the second level, and
    the second level is a level of a reference voltage.

15. The data transmission device of claim 11, wherein the transmitter comprises an encoder configured to receive the binary data and to encode the received binary data into the ternary data.

16. The data transmission data of claim 11, wherein the transmitter comprises:
    a first transistor having a drain, connected to a power supply terminal, and a gate receiving a first bit of the binary data;
    a second transistor having a drain, connected to a source of the first transistor, and a gate receiving an inverted version of the first bit;
    a third transistor having a drain connected to a source of the second transistor, a source connected to a ground terminal, and a gate receiving an enable signal;
    a fourth transistor having a drain, connected to the source of the first transistor, and a gate receiving an inverted version of a second bit of the binary data;
    a fifth transistor having a drain connected to a source of the fourth transistor, a source connected to the first line, and a gate receiving the enable signal;
    a sixth transistor having a drain, connected to the source of the first transistor, and a gate receiving the second bit; and
    a seventh transistor having a drain connected to a source of the sixth transistor, a source connected to the second line, and a gate receiving the enable signal.

17. The data transmission device of claim 16, wherein the transmitter further comprises:
    a first switch configured to provide a precharge voltage to the first line in response to a precharge signal; and a second switch configured to provide the precharge voltage to the second line in response to the precharge signal.

18. The data transmission device of claim 11, wherein the receiver comprises:
   a first comparator configured to compare a voltage of the first line and a voltage of the second line with each other in response to a clock signal;
   a second comparator configured to compare a common voltage of the first and second lines and a reference voltage with each other in response to the clock signal; and
   a decoder configured to receive a first comparison voltage of the first comparator and a second comparison voltage of the second comparator and to output a first bit and a second bit of the binary data.

19. The data transmission device of claim 18, wherein the decoder calculates the first comparison voltage and the second comparison voltage to output the first bit.

20. The data transmission device of claim 18, wherein the decoder comprises:
   a first inverter connected to an output terminal of the second comparator and configured to invert the second comparison voltage;
   a second inverter configured to invert an output value of the first inverter to output the second bit;
   a third inverter connected to an output terminal of the first comparator and configured to invert the first comparison voltage;
   a fourth inverter connected to an output terminal of the second comparator and configured to invert the second comparison voltage;
   an eighth transistor having a drain connected to the output terminal of the first comparator, a source connected to a first data line, and a gate receiving the second comparison voltage;
   a ninth transistor having a source connected to the output terminal of the first comparator, a drain connected to the first data line, and a gate connected to an output terminal of the fourth inverter;
   a tenth transistor having a drain connected to an output terminal of the third inverter, a source connected to the first data line, and a gate connected to an output terminal of the fourth inverter;
   an eleventh transistor having a source connected to an output terminal of the third inverter, a drain connected to the first data line, and a gate receiving the second comparison voltage; and
   a twelfth transistor having a drain connected to the first data line, a source connected to a ground terminal, and a gate receiving an inverted version of the clock signal.

* * * * *